(12) United States Patent
Beamon et al.

(10) Patent No.: US 9,110,266 B2
(45) Date of Patent: Aug. 18, 2015

(54) FIBER OPTIC CABLES SEAL AND/OR STRAIN RELIEF MEMBERS, AND RELATED ASSEMBLIES AND METHODS

(75) Inventors: Hubert Blair Beamon, Haltom City, TX (US); Terry Dean Cox, Keller, TX (US); Howard Clark Schwartz, Dallas, TX (US)

(73) Assignee: Corning Cable Systems LLC, Hickory, NC (US)

( * ) Notice: Subject to any disclaimer, the term of this patent is extended or adjusted under 35 U.S.C. 154(b) by 459 days.

(21) Appl. No.: 13/552,900

(22) Filed: Jul. 19, 2012

(65) Prior Publication Data

US 2013/0028568 A1    Jan. 31, 2013

Related U.S. Application Data

(60) Provisional application No. 61/513,151, filed on Jul. 29, 2011.

(51) Int. Cl.
    *G02B 6/44*    (2006.01)
(52) U.S. Cl.
    CPC .............. *G02B 6/444* (2013.01); *G02B 6/4471* (2013.01); *Y10T 29/49826* (2015.01)
(58) Field of Classification Search
    CPC ... G02B 6/4444; G02B 6/4477; G02B 6/4478
    See application file for complete search history.

(56) References Cited

U.S. PATENT DOCUMENTS

| | | |
|---|---|---|
| 3,830,957 A | 8/1974 | Oberdiear |
| 4,568,145 A | 2/1986 | Colin et al. |
| 4,795,229 A | 1/1989 | Abendschein et al. |
| 5,012,042 A | 4/1991 | Summach |
| 5,048,914 A | 9/1991 | Sneddon |
| 5,064,268 A | 11/1991 | Morency et al. |
| 5,067,783 A | 11/1991 | Lampert |

(Continued)

FOREIGN PATENT DOCUMENTS

| | | | |
|---|---|---|---|
| CH | 689434 A5 | 4/1999 | |
| EP | 0580130 A1 | 7/1993 | ............... H02G 3/22 |

(Continued)

OTHER PUBLICATIONS

Extended European Search Report for European Patent Application 12190122.7 mailed Apr. 11, 2013, 8 pages.

(Continued)

*Primary Examiner* — Michelle R Connelly

(57) ABSTRACT

Fiber optic cables seal and/or strain relief members and related assemblies and methods are disclosed. In one embodiment, an elongated member is provided that facilitates providing sealing and/or strain relief of a portion of multiple fiber optic cables not enclosed within a common outer cable jacket or sheath when disposed through the opening of the fiber optic terminal. In one embodiment, the elongated member includes a sealing portion configured to facilitate sealing of a fiber optic terminal opening when the multiple fiber optic cables are received in the sealing portion and the elongated member is disposed through the opening of the fiber optic terminal. In another embodiment, the elongated member includes a strain relief portion on a second end configured to receive and provide strain relief to the multiple fiber optic cables disposed inside the fiber optic terminal, when the elongated member is disposed through the fiber optic terminal opening.

46 Claims, 17 Drawing Sheets

(56) References Cited

U.S. PATENT DOCUMENTS

| | | | |
|---|---|---|---|
| 5,082,454 A | 1/1992 | Tonkiss et al. | |
| 5,140,659 A | 8/1992 | Minds et al. | |
| 5,210,810 A | 5/1993 | Darden et al. | |
| 5,237,129 A | 8/1993 | Obara | |
| 5,461,688 A | 10/1995 | Lee | |
| 5,473,715 A | 12/1995 | Schofield et al. | |
| 5,542,015 A | 7/1996 | Hultermans | |
| 5,566,268 A * | 10/1996 | Radliff et al. | 385/137 |
| 5,715,348 A | 2/1998 | Falkenberg et al. | |
| 5,722,842 A | 3/1998 | Cairns | |
| 5,754,724 A | 5/1998 | Peterson et al. | |
| 5,881,191 A | 3/1999 | Liberty | |
| 5,949,946 A | 9/1999 | Debortoli et al. | |
| 6,021,246 A | 2/2000 | Koshiyama et al. | 385/134 |
| 6,035,090 A | 3/2000 | Kawaguchi et al. | |
| 6,085,004 A | 7/2000 | Dower et al. | |
| 6,264,374 B1 | 7/2001 | Selfridge et al. | |
| 6,364,539 B1 | 4/2002 | Shahid | |
| 6,385,374 B2 | 5/2002 | Kropp | |
| 6,411,767 B1 | 6/2002 | Burrous et al. | |
| 6,483,980 B1 * | 11/2002 | Wu et al. | 385/137 |
| 6,533,465 B1 | 3/2003 | Lesesky et al. | |
| 6,736,545 B2 | 5/2004 | Cairns et al. | |
| 6,931,193 B2 | 8/2005 | Barnes et al. | |
| 6,952,530 B2 | 10/2005 | Helvajian et al. | |
| 6,974,262 B1 | 12/2005 | Rickenbach | |
| 7,074,066 B2 | 7/2006 | Pepe | |
| 7,097,486 B2 * | 8/2006 | Parsons | 439/291 |
| 7,118,284 B2 | 10/2006 | Nakajima et al. | |
| 7,220,065 B2 | 5/2007 | Han et al. | |
| 7,300,216 B2 | 11/2007 | Morse et al. | |
| 7,304,241 B2 | 12/2007 | Trieb et al. | |
| 7,738,759 B2 | 6/2010 | Parikh et al. | |
| 7,744,286 B2 | 6/2010 | Lu et al. | |
| 7,764,858 B2 | 7/2010 | Bayazit et al. | |
| 7,938,686 B2 | 5/2011 | Khemakhem et al. | |
| 7,942,587 B2 | 5/2011 | Barnes et al. | |
| 8,107,785 B2 | 1/2012 | Berglund et al. | |
| 8,164,044 B2 | 4/2012 | Mossman | |
| 8,208,780 B2 | 6/2012 | Hetzer et al. | |
| 8,272,787 B2 | 9/2012 | Lu et al. | |
| 8,480,312 B2 | 7/2013 | Smith et al. | |
| 8,873,926 B2 * | 10/2014 | Beamon et al. | 385/136 |
| 2002/0159745 A1 | 10/2002 | Howell et al. | |
| 2003/0010519 A1 * | 1/2003 | Pieck | 174/65 R |
| 2003/0156798 A1 | 8/2003 | Cull | |
| 2005/0082467 A1 | 4/2005 | Mossman | |
| 2006/0133759 A1 | 6/2006 | Mullaney et al. | |
| 2006/0171639 A1 | 8/2006 | Dye | |
| 2007/0014522 A1 | 1/2007 | Yamaguchi et al. | |
| 2007/0263964 A1 | 11/2007 | Cody et al. | |
| 2008/0050070 A1 | 2/2008 | Gurreri et al. | |
| 2008/0166094 A1 | 7/2008 | Bookbinder et al. | |
| 2008/0175543 A1 | 7/2008 | Durrant et al. | |
| 2008/0258018 A1 * | 10/2008 | Cox et al. | 248/69 |
| 2009/0148104 A1 | 6/2009 | Lu et al. | |
| 2009/0162016 A1 | 6/2009 | Lu et al. | |
| 2009/0169163 A1 | 7/2009 | Abbott, III et al. | |
| 2009/0245743 A1 | 10/2009 | Cote et al. | |
| 2010/0027955 A1 | 2/2010 | Parikh et al. | |
| 2010/0040331 A1 | 2/2010 | Khemakhem et al. | |
| 2010/0079759 A1 | 4/2010 | Mossman | |
| 2010/0129039 A1 | 5/2010 | Smrha et al. | |
| 2010/0303431 A1 | 12/2010 | Cox et al. | |
| 2010/0329624 A1 | 12/2010 | Zhou et al. | |
| 2011/0123157 A1 | 5/2011 | Belsan et al. | |
| 2011/0188810 A1 | 8/2011 | Ciechomski et al. | |
| 2011/0200286 A1 | 8/2011 | Smith et al. | |
| 2011/0211326 A1 | 9/2011 | Drouard et al. | |
| 2011/0229083 A1 | 9/2011 | Dainese, Jr. et al. | |
| 2012/0039571 A1 | 2/2012 | Ciechomski et al. | |
| 2014/0119705 A1 | 5/2014 | Fabrykowski et al. | |

FOREIGN PATENT DOCUMENTS

| | | | | |
|---|---|---|---|---|
| EP | 1199587 A1 | 4/2002 | | |
| FR | 2546308 A | * 11/1984 | | |
| JP | 0772338 A | 3/1995 | | |
| WO | WO 01/59501 A1 | 8/2001 | | G02B 6/44 |
| WO | WO 2004/051338 A1 | 6/2004 | | G02B 6/44 |
| WO | WO 2004051338 A1 * | 6/2004 | | |
| WO | 2005078493 A1 | 8/2005 | | |
| WO | 2006044080 A1 | 4/2006 | | |
| WO | 2006060250 A2 | 6/2006 | | |
| WO | 2006123214 A1 | 11/2006 | | |
| WO | 2008048935 A2 | 4/2008 | | |
| WO | 2008139218 A1 | 11/2008 | | |
| WO | 2009018439 A1 | 2/2009 | | |
| WO | 2011088613 A1 | 7/2011 | | |
| WO | 2012074684 A2 | 6/2012 | | |

OTHER PUBLICATIONS

Notice of Allowance for U.S. Appl. No. 14/061,294 mailed Dec. 17, 2014, 7 pages.

International Search Report and Written Opinion for PCT/US2011/027813 mailed Jun. 24, 2011, 14 pages.

Final Office Action for U.S. Appl. No. 13/014,229 mailed May 22, 2014, 13 pages.

Advisory Action for U.S. Appl. No. 13/014,229 mailed Jul. 10, 2014, 4 pages.

Non-final Office Action for U.S. Appl. No. 13/014,229 mailed Sep. 23, 2013, 12 pages.

Applicant-Initiated Interview Summary for U.S. Appl. No. 13/014,229 mailed Jan. 31, 2014, 3 pages.

Non-final Office Action for U.S. Appl. No. 13/603,928 mailed Apr. 18, 2013, 11 pages.

Notice of Allowance for U.S. Appl. No. 13/603,928 mailed Sep. 23, 2013, 7 pages.

Notice of Allowance for U.S. Appl. No. 13/603,928 mailed Jan. 15, 2014, 7 pages.

Notice of Allowance for U.S. Appl. No. 13/603,928 mailed Apr. 21, 2014, 7 pages.

Non-final Office Action for U.S. Appl. No. 13/741,529 mailed Jan. 27, 2014, 11 pages.

Notice of Allowance for U.S. Appl. No. 13/741,529 mailed May 14, 2014, 8 pages.

International Search Report for PCT/US2012/027367 mailed Sep. 11, 2012, 6 pages.

International Preliminary Report on Patentability for PCT/US2012/027367 mailed Sep. 19, 2013, 10 pages.

Non-Final Office Action for U.S. Appl. No. 13/014,229 mailed Dec. 5, 2014, 12 pages.

Non-final Office Action for U.S. Appl. No. 13/302,067 mailed Jun. 7, 2013, 13 pages.

Final Office Action for U.S. Appl. No. 13/302,067 mailed Oct. 11, 2013, 11 pages.

Notice of Allowance for U.S. Appl. No. 13/302,067 mailed Jul. 25, 2014, 7 pages.

Non-final Office Action for U.S. Appl. No. 13/302,067 mailed Oct. 16, 2014, 7 pages.

Advisory Action for U.S. Appl. No. 13/302,067 mailed Dec. 27, 2013, 3 pages.

Applicant-Initiated Interview Summary for U.S. Appl. No. 13/302,067 mailed Jan. 15, 2014, 3 pages.

Final Office Action for U.S. Appl. No. 13/302,067 mailed Jan. 27, 2014, 7 pages.

Advisory Action for U.S. Appl. No. 13/302,067 mailed Apr. 7, 2014, 3 pages.

Notice of Allowance for U.S. Appl. No. 13/302,067 mailed Feb. 11, 2015, 7 pages.

* cited by examiner

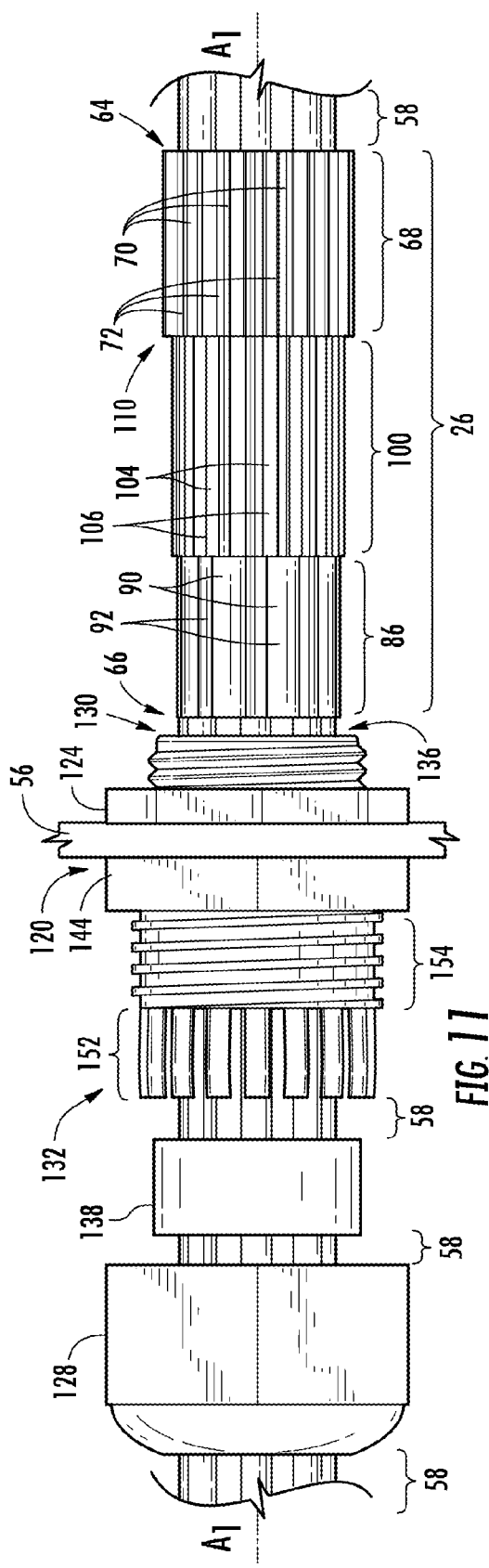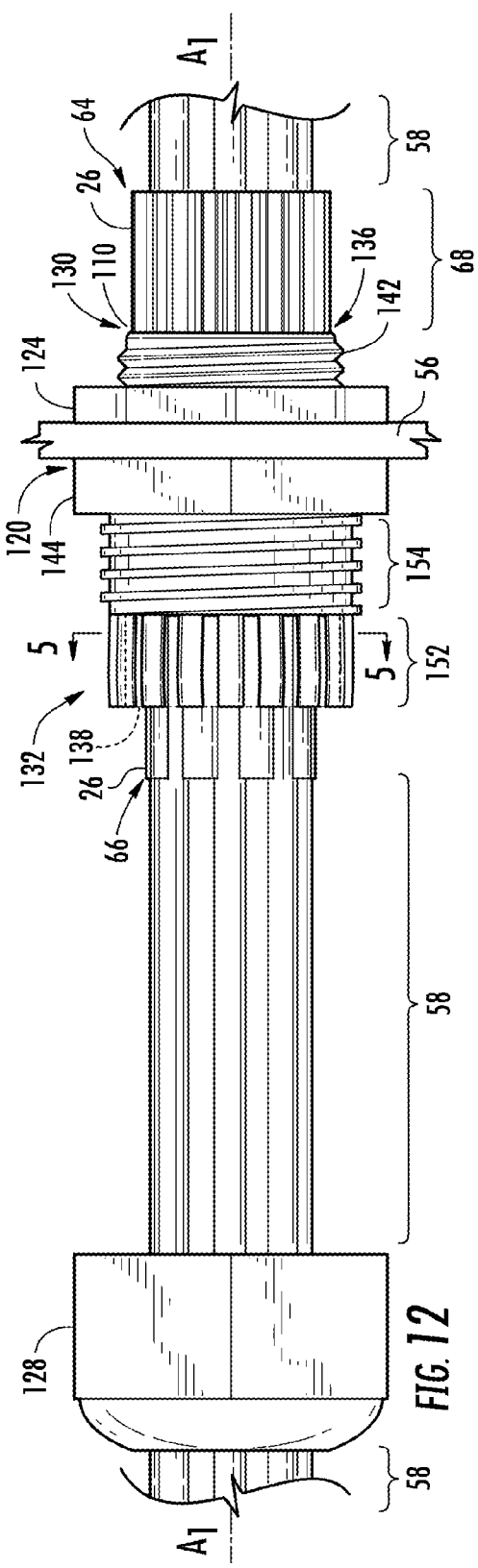

FIBER OPTIC CABLES SEAL AND/OR STRAIN RELIEF MEMBERS, AND RELATED ASSEMBLIES AND METHODS

RELATED APPLICATIONS

This application claims the benefit of priority under 35 U.S.C. §119 of U.S. Provisional Application Ser. No. 61/513,151 filed on Jul. 29, 2011 the content of which is relied upon and incorporated herein by reference in its entirety.

BACKGROUND

1. Field of the Disclosure

The technology of the disclosure relates to fiber optic equipment, such as local convergence points (LCPs) and fiber distribution terminals (FDTs), and fiber optic cables disposed therein to provide fiber optic connections to subscribers.

2. Technical Background

To provide improved performance to subscribers, communication and data networks are increasingly employing optical fiber. The benefits of optical fiber are well known and include higher signal-to-noise ratios and increased bandwidth. To further improve performance, fiber optic networks are increasingly providing optical fiber connectivity all the way to end subscribers. These initiatives include various fiber-to-the-premises (FTTP), fiber-to-the-home (FTTH), and other fiber initiatives (generally described as FTTx). In this regard, FIG. 1 illustrates an exemplary fiber optic network 10. The fiber optic network 10 in this example is a passive optical network (PON). A PON is a point-to-multipoint FTTx network architecture to enable an optical fiber to serve multiple premises. A PON configuration generally reduces the amount of optical fiber and central office equipment as compared with point-to-point optical network architectures.

The fiber optic network 10 in FIG. 1 provides optical signals from switching points 12 over a distribution network 13 comprised of fiber optic feeder cables 14. The switching points 12 include optical line terminals (OLTs) or forward lasers/return receivers 15 that convert electrical signals to and from optical signals. The optical signals may then be carried over the fiber optic feeder cables 14 to local convergence points (LCPs) 16. The LCPs 16 serve as consolidation points for splicing and making cross-connections and interconnections, as well as providing locations for optical couplers and splitters. The optical couplers and splitters in the LCPs 16 enable a single optical fiber to serve multiple subscriber premises 20. Fiber optic cables 18, such as distribution cables, exit the LCPs 16 to carry optical signals between the fiber optic network 10 and the subscriber premises 20. Typical subscriber premises 20 include single-dwelling units (SDU), multi-dwelling units (MDU), businesses, and/or other facilities or buildings. End subscribers in the subscriber premises 20 may contain network devices configured to receive electrical signals as opposed to optical signals. Thus, optical network terminals (ONTs) and/or optical network units (ONUs) 21 may be provided at the subscriber premises 20 to convert optical signals received over the fiber optic cables 18 to electronic signals.

Because LCPs 16 are typically configured to service multiple premises 20, the fiber optic cables 18 leaving the LCPs 16 are typically run to one or more intermediate fiber distribution terminals (FDTs) 22. FDTs 22 facilitate FTTx applications by providing network access points to the fiber optic network 10 to groupings of subscriber premises 20. Optical interconnections to the subscriber premises 20 are typically provided via indoor/outdoor drop cables 24 that are optically interconnected with the fiber optic cables 18 within the FDTs 22. The FDTs 22 may also provide a consolidated location for technicians or other installation personnel to make and protect splices and/or connections between the drop cables 24 and the fiber optic cables 18 as opposed to making splices and/or connections in sporadic locations.

A fiber optic enclosure may be part of a fiber optic terminal that may serve as a LCP 16 or FDT 22 in the fiber optic network 10 of FIG. 1. A cable fitting assembly may be attached around an opening of a wall of the fiber optic enclosure. The opening and cable fitting assembly provides a passageway for one or more fiber optic cables to travel between an outside and an inside of the fiber optic enclosure.

Sealing the fiber optic enclosure from outside water and other contaminants is an important consideration for the fiber optic networks. Mold, water, and other contaminants could over time enter the fiber optic terminals and degrade the performance of the fiber optic equipment inside.

Further, the fiber optic cables exiting a fiber optic terminal may need strain relief as part of bend radius management and optical fiber movement that can damage the cable or cause signal attenuation. Conventional fiber optic terminals have at least one strain relief mechanism inside the fiber optic enclosure to relieve strain in the separate fiber optic cables. Strain relief mechanisms occupy valuable space in the fiber optic enclosure that could be used for additional fiber optic equipment, but the strain relief mechanisms are beneficial because they resist longitudinal forces placed on the fiber optic cables.

SUMMARY OF THE DETAILED DESCRIPTION

Embodiments disclosed herein include fiber optic cables sealing and/or strain relief members, and related assemblies and methods. In one embodiment, an elongated member is provided that facilitates providing sealing and/or strain relief of multiple fiber optic cables. In one embodiment, the elongated member is configured to facilitate sealing and/or strain relief of portions of multiple fiber optic cables not enclosed within a common outer cable jacket or sheath when disposed through the opening of the fiber optic terminal. In one embodiment, the elongated member includes a sealing portion disposed on a first end that is configured to receive the multiple fiber optic cables. The sealing portion is configured to facilitate sealing of the opening of a fiber optic terminal when the multiple fiber optic cables are received in the sealing portion and the elongated member is disposed through the opening of the fiber optic terminal. In another embodiment, the elongated member includes a strain relief portion on a second end. The strain relief portion is configured to receive and provide strain relief to the multiple fiber optic cables disposed inside the fiber optic terminal, when the elongated member is disposed through the opening of the fiber optic terminal.

In one embodiment, an elongated member is disclosed for sealing off an opening located through an enclosure wall of a fiber optic enclosure. The fiber optic enclosure has a plurality of fiber optic cables therethrough. This elongated member may include a first end, a second end, a strain relief portion, a sealing portion, and an intermediate portion. The second end may be located opposite the first end along a longitudinal axis. The strain relief portion may be located at the first end. The strain relief portion may include a plurality of recesses forming a plurality of openings configured to each receive one of a plurality of fiber optic cables. Each of the plurality of recesses may be separated by one of a plurality of external surfaces and disposed parallel to the longitudinal axis. The sealing portion may be located at the second end. The sealing portion may include a plurality of second recesses forming a plurality of second openings and may be configured to each receive one of the plurality of fiber optic cables. Each of the plurality of second recesses may be separated by one of a plurality of external surfaces and disposed parallel to the longitudinal axis. The intermediate portion may be disposed between the strain relief portion and the sealing portion.

In another embodiment, a cable fitting assembly for an opening of a fiber optic enclosure is disclosed. This cable fitting assembly may include an elongated cable fitting body, a clamping mechanism, a locknut, and an elongated member. The elongated cable fitting body may include a first cable fitting end having a male thread, a second cable fitting end opposite the first cable fitting end, an orifice, and a cable fitting base disposed between the first fitting end and the second fitting end. The orifice may exist through the elongated cable fitting body from the first cable fitting end to the second cable fitting end. The orifice may also be configured to receive a plurality of fiber optic cables. The cable fitting base may include a base wall surface configured to form a contact area on a surface around an orifice of an enclosure wall. The locknut may include a threaded orifice and locknut pushing surface. The locknut may be configured to be removeably attached to the first cable fitting end and may be configured to pull the base wall surface against the contact area.

In this embodiment, the elongated member may include a first end, a second end, a strain relief portion, a sealing portion, and an intermediate portion. The second end may be located opposite the first end along a longitudinal axis. The strain relief portion may be located at the first end. The strain relief portion may include a plurality of recesses forming a plurality of openings configured to each receive one of a plurality of fiber optic cables. Each of the plurality of recesses may be separated by one of a plurality of external surfaces and disposed parallel to the longitudinal axis. The sealing portion may be located at the second end. The sealing portion may include a plurality of second recesses forming a plurality of second openings and may be configured to each receive one of the plurality of fiber optic cables. Each of the plurality of second recesses may be separated by one of a plurality of external surfaces and disposed parallel to the longitudinal axis. The intermediate portion may be disposed between the strain relief portion and the sealing portion.

In another embodiment, a method is disclosed for installing a cable fitting assembly with a plurality of fiber optic cables into an opening of a fiber optic enclosure. This method may include inserting a first cable fitting end of an elongated cable fitting body through an opening of a fiber optic enclosure and securing the first cable fitting end to the fiber optic enclosure with a locknut. The method may also include inserting an end of a plurality of fiber optic cables through an orifice of the elongated cable fitting body. The method may also include receiving the plurality of the fiber optic cables through a plurality of openings into a plurality of recesses in a strain relief portion disposed at a first end of an elongated member. Each of the plurality of recesses may be separated by one of a plurality of external surfaces and disposed parallel to the longitudinal axis. The method may also include receiving the plurality of the fiber optic cables through a plurality of second openings into a plurality of second recesses in a sealing portion disposed at a second end of the elongated member. Each of the plurality of second recesses may be separated by one of a plurality of second external surfaces and disposed parallel to the longitudinal axis.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 11 is a side view showing the plurality of fiber optic cables being received into the elongated member of FIG. 4A;

FIG. 12 is a side view showing the sealing portion of elongated cable fitting body inserted through the elongated cable fitting body of FIG. 4A;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include fiber optic cables sealing and/or strain relief members, and related assemblies and methods. In one embodiment, an elongated member is provided that facilitates providing sealing and/or strain relief of multiple fiber optic cables. In one embodiment, the elongated member is configured to facilitate sealing and/or strain relief of portions of multiple fiber optic cables not enclosed within a common outer cable jacket or sheath when disposed through the opening of the fiber optic terminal. In one embodiment, the elongated member includes a sealing portion disposed on a first end that is configured to receive the multiple fiber optic cables. The sealing portion is configured to facilitate sealing of the opening of a fiber optic terminal when the multiple fiber optic cables are received in the sealing portion and the elongated member is disposed through the opening of the fiber optic terminal. In another embodiment, the elongated member includes a strain relief portion on a second end. The strain relief portion is configured to receive and provide strain relief to the multiple fiber optic cables disposed inside the fiber optic terminal, when the elongated member is disposed through the opening of the fiber optic terminal.

Figure 1:
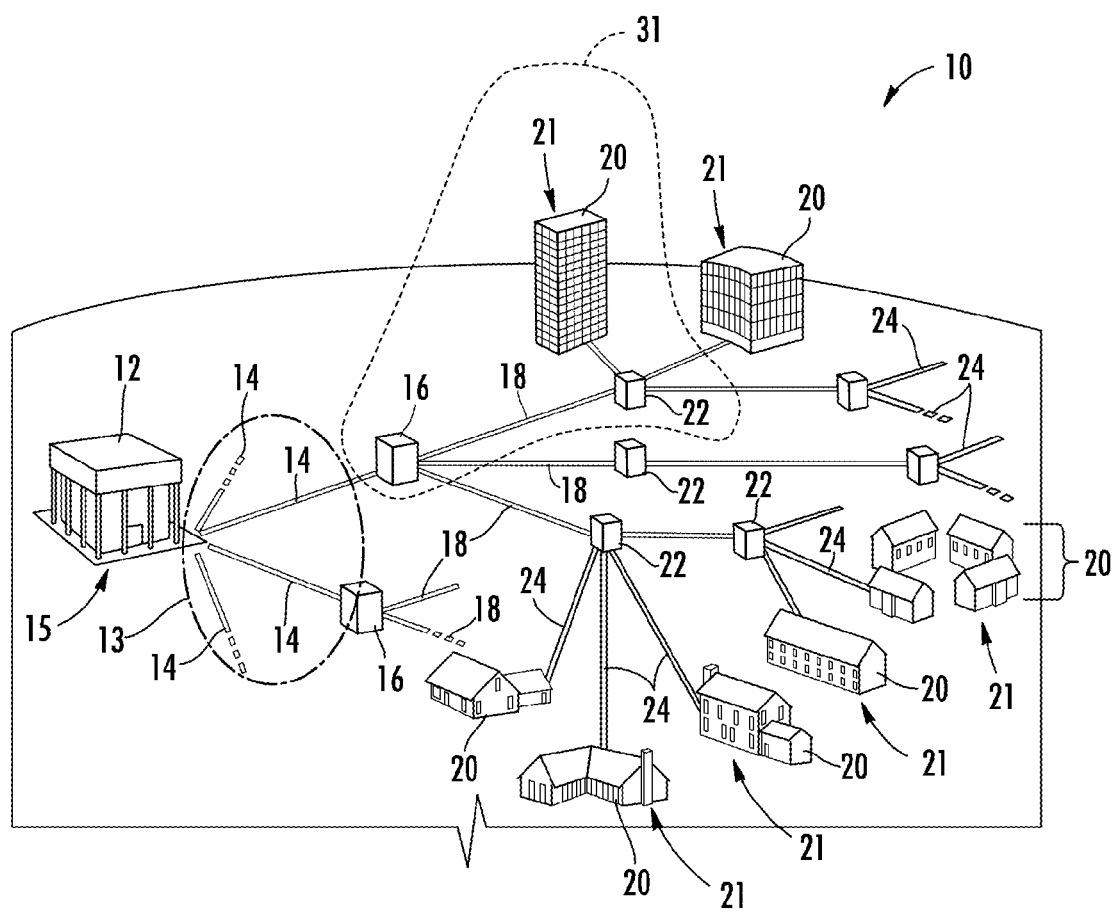
FIG. 1 illustrates an exemplary passive optical network (PON) in the prior art including an exemplary multi-dwelling unit (MDU) that includes optical network terminals (ONTs) and optical network units (ONUs) for converting electrical signals to optical signals, and vice versa, and fiber optic terminals for carrying optical signals over a fiber optic network.
Figure 2:
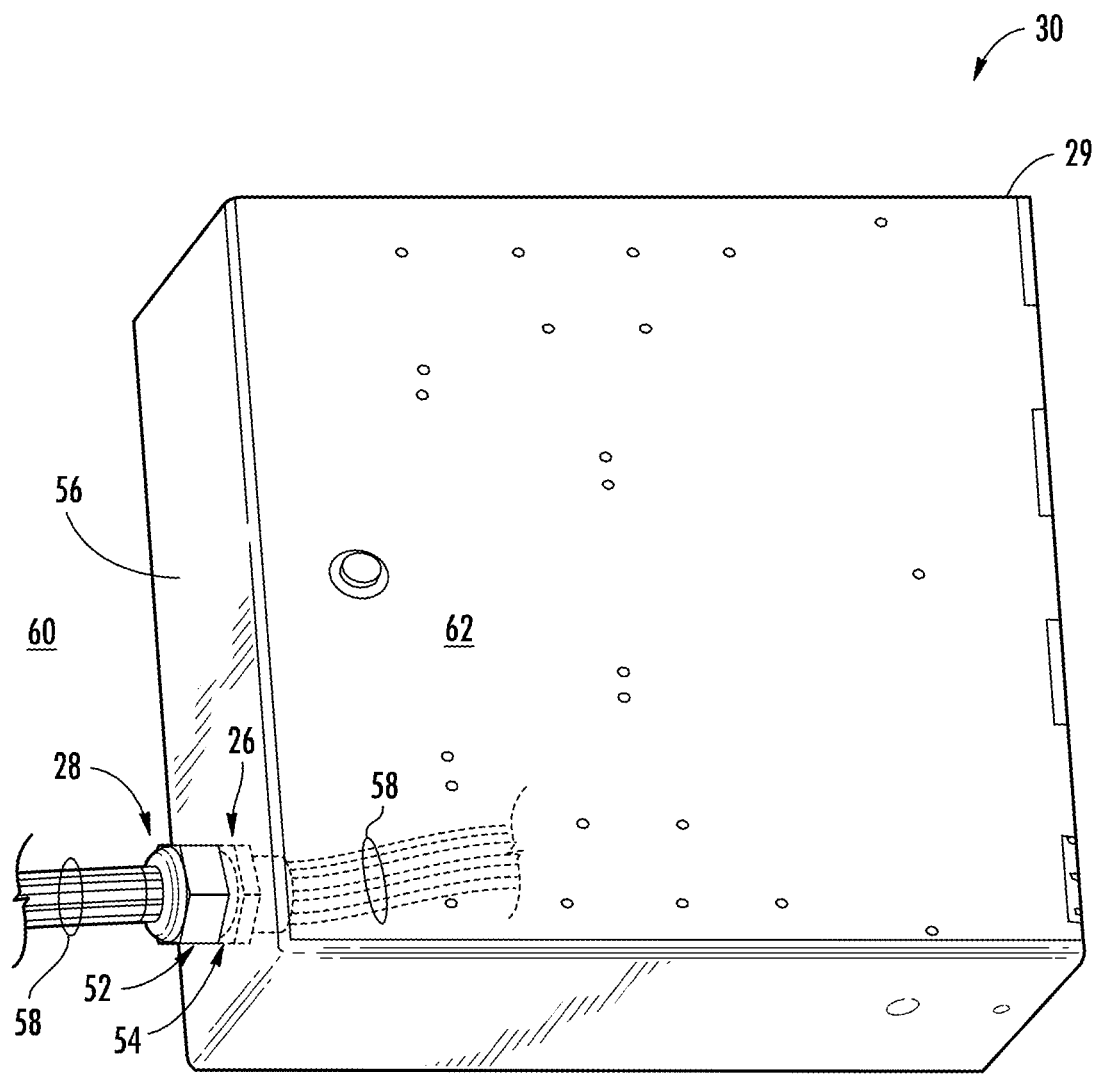
FIG. 2 illustrates an exemplary fiber optic terminal that may be employed with a cable fitting including an exemplary elongated member.

FIG. 2 shows a fiber optic enclosure 29 as part of a fiber optic terminal 30. The fiber optic terminal 30 may serve as a local convergence point (LCP) or a fiber optic distribution terminal (FDT) in a fiber optic network, as non-limiting examples. A cable fitting assembly 28 may be attached to a contact surface 52 around an opening 54 of a wall 56 of the fiber optic enclosure 29. The cable fitting assembly 28 may include an elongated member 26 (discussed later) to provide strain relief and/or sealing against contamination. The opening 54 provides a passageway for a plurality of fiber optic cables 58 to travel between an outside 60 and an inside 62 of the fiber optic enclosure 29. The opening 54 may be made during initial manufacturing or later during installation by removing "knockout" material by, for example, cutting or applying force.

The fiber optic terminals 30 provide convenient access points in a telecommunications or data network for a field technician to install and reconfigure optical fiber connections between network-side and subscriber-side fiber optic cables. The fiber optic terminals 30 are configured to allow one or more optical fibers provided in one or more network-side or upstream fiber optic cables, for example feeder cables, to be easily and readily interconnected with one or more optical fibers in one or more subscriber-side or downstream fiber optic cables, for example drop cables. By the term "subscriber-side," it is meant that optical fiber, fiber optic cable, or optical connection, as the case may be, is provided anywhere between the end subscriber and the fiber optic terminals 30. A subscriber-side fiber optic cable, optical fiber, or optical connection may be provided directly to an end subscriber or may be provided to one or more intermediate optical terminals or components before reaching an end subscriber. By the term "network-side," it is meant that the optical fiber, fiber optic cable, or optical connection, as the case may be, is provided between a fiber optic network, central switching point, central office, head end, or the like and the fiber optic terminals 30.

Sealing the fiber optic enclosure 29 from outside water and other contaminants is an important consideration for the fiber optic networks. Mold, water, and other contaminants could over time enter the fiber optic terminals and degrade the performance of the fiber optic equipment inside. The fiber optic terminals 29 with a fiber optic cable exiting an opening are relatively straightforward to seal. An opening 54 may be created in the outer wall 56 of the fiber optic terminal 29 consistent with a standard fiber optic cable size and cable fittings that are commercially available. The cable fitting may be configured to attach to the outer wall 56 and through the opening 54, and clamp a circular seal ring around the outer jacket of the fiber optic cable. Multiple optical fibers may be "broken-out" from the outer jacket at a fiber optic terminal 30 closer to a group of the subscriber premises 20, so that they may travel to separately to each of the subscriber premises 20.

In the case of subscriber-side fiber optic cables 46 that are not enclosed in a common outer cable jacket when exiting the opening 54, one solution has been to utilize cable fittings used for fiber optic cables having outer jackets. In this instance, each of the loose fiber optic cables can be inserted through separate longitudinal holes disposed inside a flexible cylinder member. The flexible cylinder member can be inserted into the cable fitting assembly 28 to facilitate providing an outer surface to create a seal. The inner diameters of the longitudinal holes are sized to allow the fiber optic cables to fit therethrough without gaps that would be incompatible with sealing. However, by this arrangement, cables that are preconnectorized cannot be disposed through the longitudinal holes of the cylinder member, because the connectors cannot fit through the longitudinal holes. A solution would be to increase the inner diameter of the longitudinal holes of the cylinder member to accommodate the connectors. However, the effective sealing capability is reduced because of unacceptable gap spacing between the outer diameter of the fiber optic cable and the inner diameter of the longitudinal holes.

Further, the fiber optic cables 58 entering a fiber optic terminal 30 may need strain relief as part of bend radius management and optical fiber movement that can damage the cable or cause signal attenuation. Conventional fiber optic terminals have at least one strain relief mechanism (not shown) inside the fiber optic enclosure to relieve strain in the separate fiber optic cables. Strain relief mechanisms occupy valuable space in the fiber optic enclosure that could be used for additional fiber optic equipment, but the strain relief mechanisms are beneficial because they resist longitudinal forces placed on the fiber optic cables. Thus, there is an unmet need to provide strain relief capability without occupying as much valuable space in the fiber optic terminal.

Figure 3A:
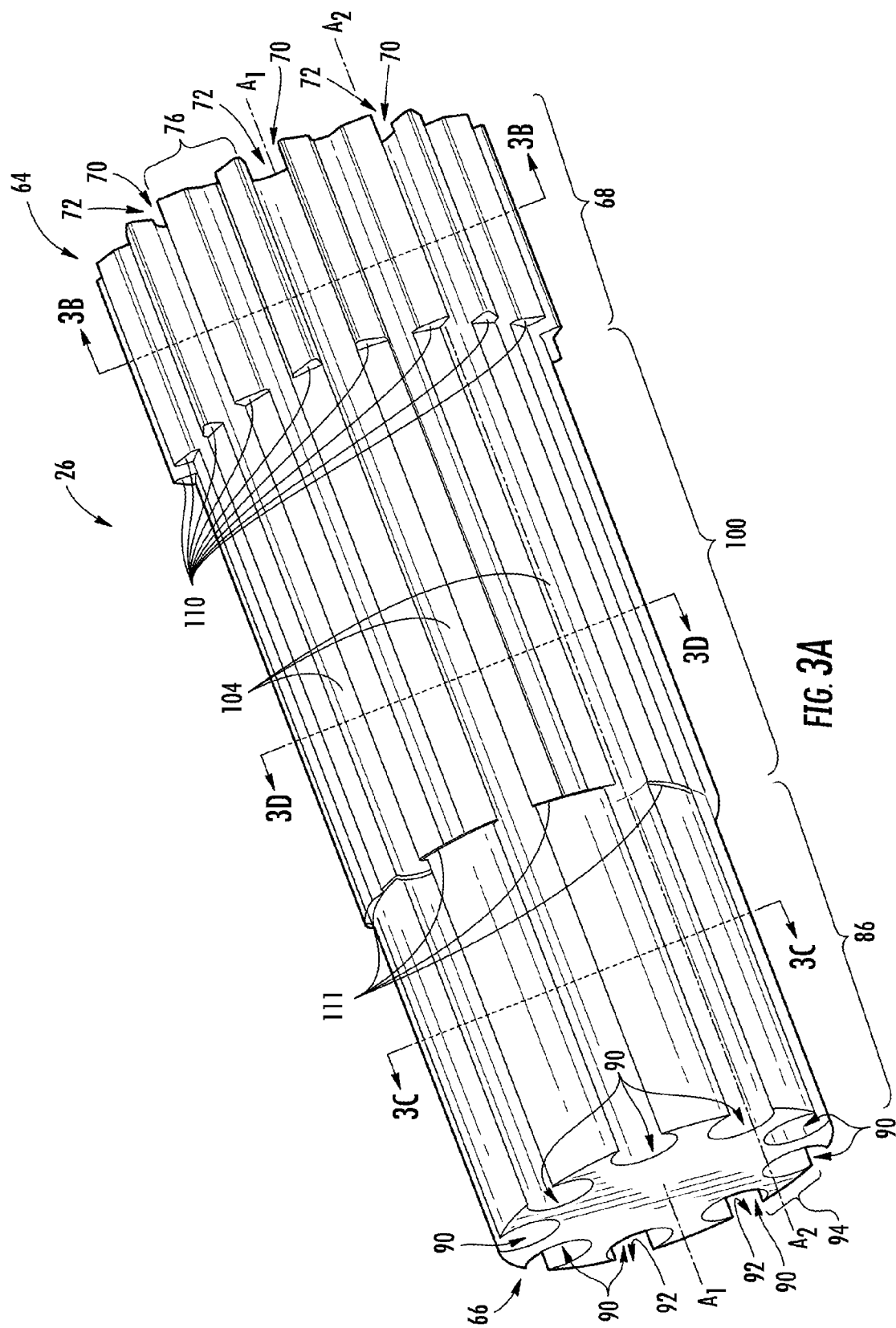
FIG. 3A is a side view of an exemplary elongated member for providing sealing and/or strain relief for multiple fiber optic cables disposed through an opening of a fiber optic terminal.

In this regard, FIG. 3A is a side view of the exemplary elongated member 26 for providing sealing and/or strain relief for multiple fiber optic cables disposed through an opening of a fiber optic terminal, such as fiber optic terminal 30 in FIG. 2 as an example. FIG. 3A illustrates a perspective close-up view of the elongated member 26 including a first end 64 and a second end 66 disposed opposite the first end 64 along a longitudinal axis $A_1$. A strain relief portion 68 may be disposed at the first end 64 and may serve to reduce the strain on each of the plurality of fiber optic cables 58 by securely attaching them to the elongated member 26 and resisting longitudinal movement of the plurality of fiber optic cables 58. The strain relief portion 68 may effectively resist longitudinal forces of up to ten (10) pounds on the plurality of fiber optic cables 58 by applying sufficient forces normal to the longitudinal axis of each the plurality of fiber optic cables 58 to thereby preventing optical fiber movement within outer cable jackets (not shown). Optic fiber movement may cause undesirable effects, for example, signal attenuation and/or breakage. The strain relief portion 68 may effectively resist longitudinal forces of over ten (10) pounds on the plurality of fiber optic cables 58 by a use of a circular clamp (discussed later).

Figure 3B:
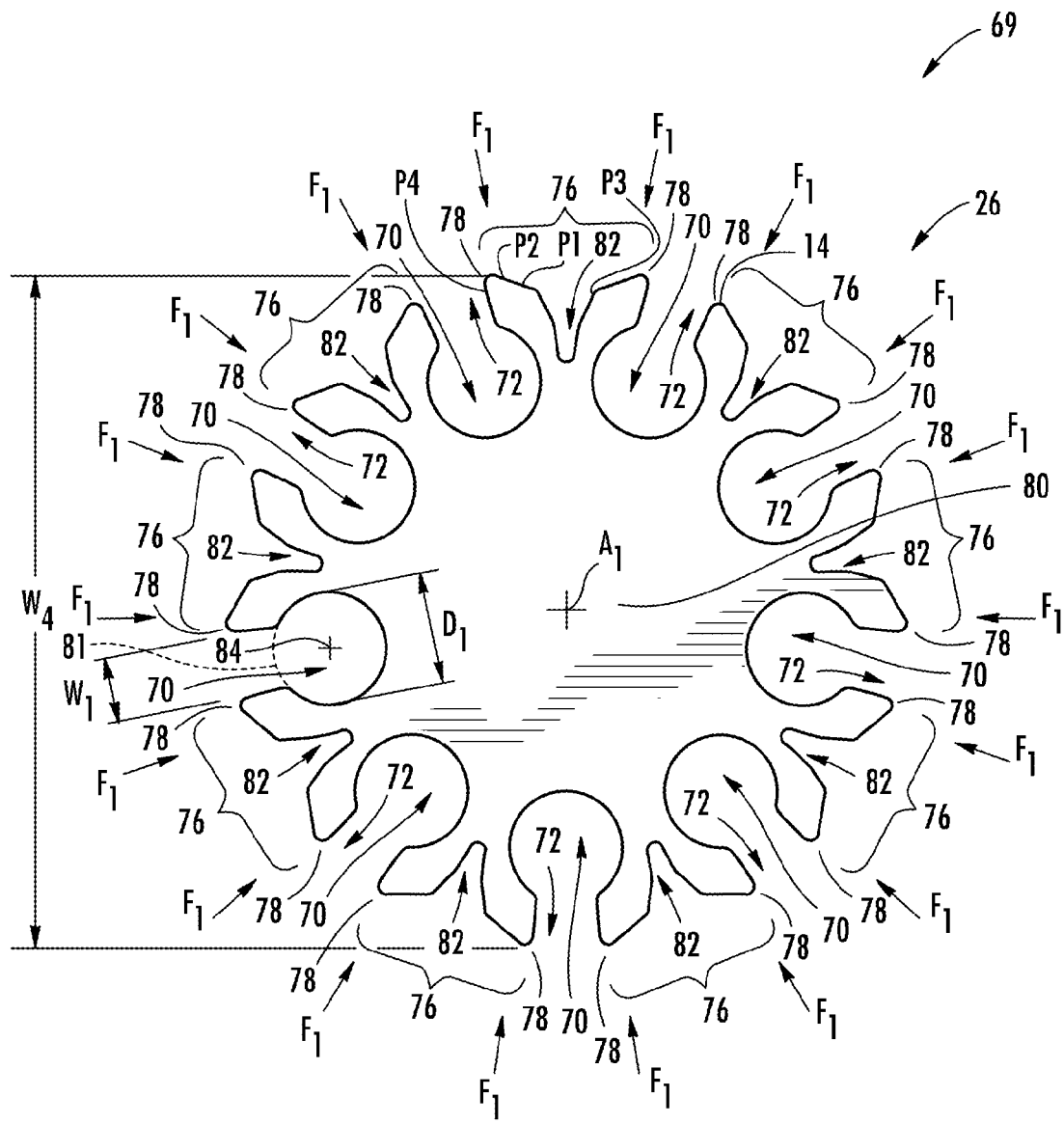
FIG. 3B is a cross-section of a strain relief portion of the elongated member of FIG. 3A.

As shown in a cross-section 69 of the strain relief portion 68 perpendicular to the longitudinal axis in FIG. 3B, the strain relief portion 68 includes a plurality of recesses 70 forming a plurality of openings 72 configured to each receive one of the plurality of fiber optic cables 58. The plurality of fiber optic cables 58 may be received into the plurality of recesses 70 through the plurality of openings 72 in a direction substantially perpendicular to the longitudinal axis $A_1$ as opposed to sliding the plurality of fiber optic cables 58 longitudinally through the plurality of recesses 70. Sliding the plurality of fiber optic cables 58 may not be feasible if the plurality of fiber optic cables 58 have connectors 74 (shown later in FIG. 10) which would be too wide to slide in a longitudinal direction through the plurality of recesses 70. Each of the plurality of recesses 70 may be separated by one of a plurality of external surfaces 76 and may be disposed or orientated parallel to the longitudinal axis $A_1$.

In the embodiment of the elongated member 26 depicted in FIG. 3A, each of the plurality of external surfaces 76 has at least one extension member 78, and specifically two (2) extension members 78. Each of the at least one extension member 78 in FIG. 3B extends away from the interior 80 of the strain relief portion 68, thus the points on the plurality of the external surfaces 76 cannot be equidistant to the longitudinal axis $A_1$. For example, as depicted in FIG. 3B, points $P_1$, $P_2$, $P_3$, and $P_4$ are not equidistant from the longitudinal axis $A_1$ but are on two of the at least one extension members 78 and therefore also on the plurality of external surfaces 76. Each of the at least one extension member 78 are configured to at least partially close one of the plurality of openings 72 when subject to a plurality of inward-facing forces $F_1$ directed towards an interior 80 of the strain relief portion 68.

One or more of the plurality of external surfaces 76 may include at least one groove 82 as depicted in FIG. 3B. The at least one groove 82 may provide more flexibility to the plurality of external surfaces 76, and particularly to the at least one extension member 78, to enable the plurality of fiber optic cables 58 to be more easily received through the plurality of openings 72 to be disposed in the plurality of recesses 70.

Each of the plurality of recesses 70 may include a circular-shaped cross-section 81 having a diameter $D_1$ and a center 84. The circular-shaped cross-section 81 may enable the plurality of recesses 70 to better fit the contour of a circular-shaped cross section of each of the plurality of fiber optic cables 58 (discussed later) and thereby improve strain relief by preventing slippage of plurality of fiber optic cables 58.

The diameter $D_1$ of the circular-shaped cross-section 81 may be sized for the particular cable size that will be received. Currently, the plurality of fiber optic cables 58 having diameters of 4.8 millimeters or 1.6 millimeters are in wide use at multi-dwelling unit (MDU) installations. In the embodiment shown in FIG. 3B, the diameter $D_1$ may be 4.8 millimeters to 4.5 millimeters and thereby may be approximately up to 6% smaller than the nominal diameter of the plurality of fiber optic cables 58. The elongated member 26 may include the plurality of recesses 70 that each have diameters $D_1$ of a same length to accommodate a single cable diameter distance or various lengths to accommodate the plurality of fiber optic cables 58 comprising a variety of different cable diameters for the elongated member 26.

The plurality of recesses 70 in the embodiment of the elongated member 26 shown in FIG. 3B comprises nine (9) recesses 70. The quantity of recesses 70 in the elongated member may vary.

Each of the plurality of openings 72 may include a width $W_1$. The width $W_1$ may be a minimum width within a cross-section 69 of each of the plurality of openings 72. For each of the plurality of openings 72, the width $W_1$ may be of a smaller distance than the diameter $D_1$ of the circular-shaped cross-section 81 of the plurality of recesses 70. The plurality of fiber optic cables 58 may be held more tightly in the plurality of recesses 70 if the width $W_1$ is of the smaller distance.

The strain relief portion 68 may be made of a strong, resilient material, for example, a thermoplastic, thermoplastic elastomer or a thermoplastic polyester elastomer. The cross-section 69 of the strain relief portion 68 may remain unchanged parallel to the longitudinal axis $A_1$ to enable the strain relief portion 68 to be manufactured using an extrusion process (not shown). The strain relief portion 68 may also be manufactured via an injection molding or casting process.

With continuing reference to FIG. 3A, a sealing portion 86 may be disposed at the second end 66 of the elongated member 26 and may serve to seal the opening 54 of the wall 56 of the fiber optic enclosure 29. The sealing portion 86 may allow the cable fitting assembly 28 to be at least compliant to the industry-standard Telecordia® GR-3123 water intrusion requirements by resisting water from fire sprinkler heads from entering the inside 62 of the fiber optic enclosure 29 from the outside 60. Water entry into the fiber optic enclosure 29 may have undesirable effects, for example, mold growth or corrosion.

Figure 3C:
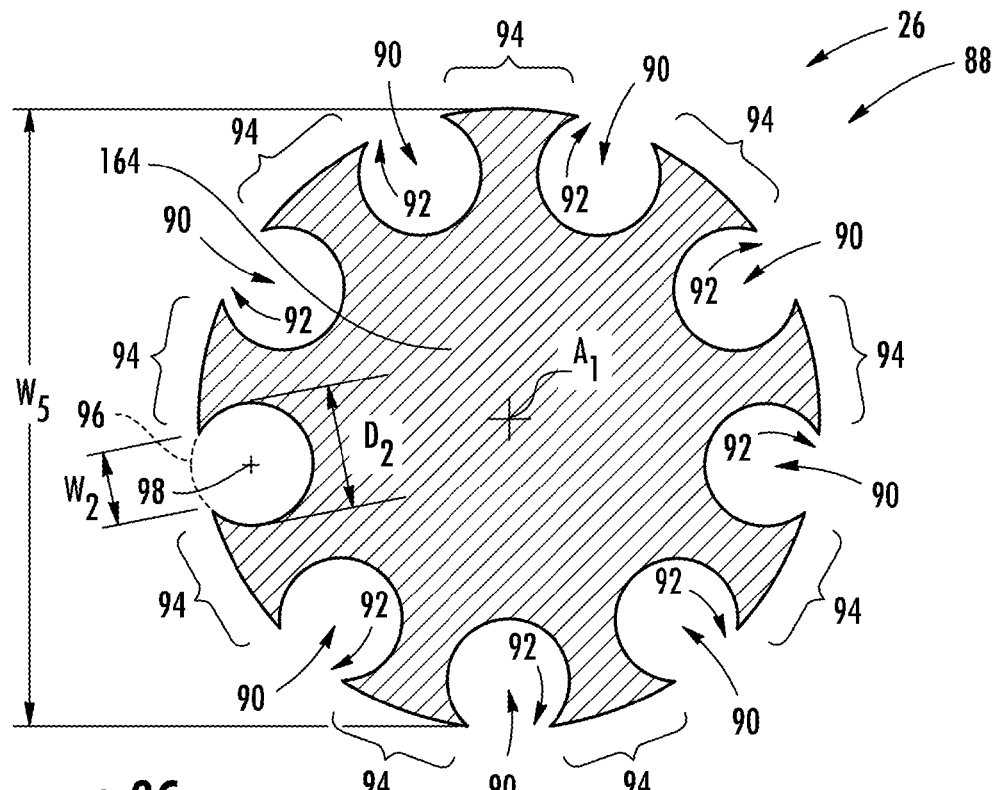
FIG. 3C is a cross-section of a sealing portion of the elongated member of FIG. 3A.

As shown in a cross-section 88 of the sealing portion 86 perpendicular to the longitudinal axis $A_1$ in FIG. 3C, the sealing portion 86 includes a plurality of second recesses 90 forming a plurality of second openings 92 configured to each receive one of the plurality of fiber optic cables 58. The plurality of fiber optic cables 58 may be received into plurality of second recesses 90 through the plurality of second openings 92 in a direction substantially perpendicular to the longitudinal axis $A_1$ as opposed to sliding the plurality of fiber optic cables 58 longitudinally through the plurality of second recesses 90. Sliding the plurality of fiber optic cables 58 longitudinally may not be feasible if the plurality of fiber optic cables 58 have the connectors 74 (shown later in FIG. 10) which would be too wide to slide in a longitudinal direction through the plurality of second recesses 90. Each of the plurality of second recesses 90 may be separated by one of a plurality of second external surfaces 94 and may be disposed or orientated parallel to the longitudinal axis $A_1$.

The plurality of second external surfaces 94 may or may not be equidistant to the longitudinal axis $A_1$. In the exemplary embodiment of the elongated member 26 depicted in FIGS. 3A and 3C, each of the plurality of second external surfaces 94 may be equidistant to the longitudinal axis $A_1$.

Each of the plurality of second recesses 90 may include a circular-shaped cross-section 96 having a diameter $D_2$ and a center 98, The circular-shaped cross-section 96 may enable the plurality of second recesses 90 to better fit the contour of a circular-shaped cross section of each of the plurality of fiber optic cables 58 (discussed later) and thereby better prevent the passage of water or contaminants past the plurality of fiber optic cables 58 and into the fiber optic enclosure 29.

The diameter $D_2$ may be sized for the particular cable size that will be received. Currently, the plurality of fiber optic cables 58 having a diameter of 4.8 millimeters or 1.6 millimeters are in wide use at multi-dwelling unit (MDU) installations. In the embodiment shown in FIG. 3C, the diameter $D_2$ may be 4.8 millimeters to 4.5 millimeters and thereby may be approximately up to 6% smaller than the nominal diameter of the plurality of fiber optic cables 58. The elongated member 26 may include the plurality of second recesses 90 that each have diameters $D_2$ of a same length to accommodate a single cable diameter or various distances to accommodate the plurality of fiber optic cables 58 comprising a variety of different cable diameters for the elongated member 26.

The plurality of second recesses 90 in the embodiment of the elongated member 26 shown in FIG. 3C comprises nine (9) second recesses 90. The quantity of second recesses 90 in the elongated member 26 may vary.

Each of the plurality of second openings 92 may include a width $W_2$. The width $W_2$ may be a minimum width within a cross-section 88 of each of the plurality of second openings 92. For each of the plurality of second openings 92, the width $W_2$ may be of a smaller distance than the diameter $D_2$ of the circular-shaped cross-section 96 of the plurality of second recesses 90. The plurality of fiber optic cables 58 may be held more tightly in the plurality of second recesses 90 if the width $W_2$ is of the smaller distance.

The sealing portion 86 may be made of a strong, resilient material, for example, a thermoplastic, thermoplastic elastomer or a thermoplastic polyester elastomer. The cross-section 88 of the sealing portion 86 may remain unchanged parallel to the longitudinal axis $A_1$ to enable the sealing portion 86 to be manufactured using an extrusion process (not shown). The sealing portion 86 may also be manufactured via an injection molding or casting process.

With continuing reference to FIG. 3A, an intermediate portion 100 (see FIG. 3A) may be disposed between the strain relief portion 68 and the sealing portion 86. The intermediate portion 100 may serve to both guide the plurality of fiber optic cables 58 between the plurality of recesses 70 of the strain relief portion 68 and the plurality of second recesses 90 of the sealing portion 86, and to connect the strain relief portion 68 to the sealing portion 86.

Figure 3D:
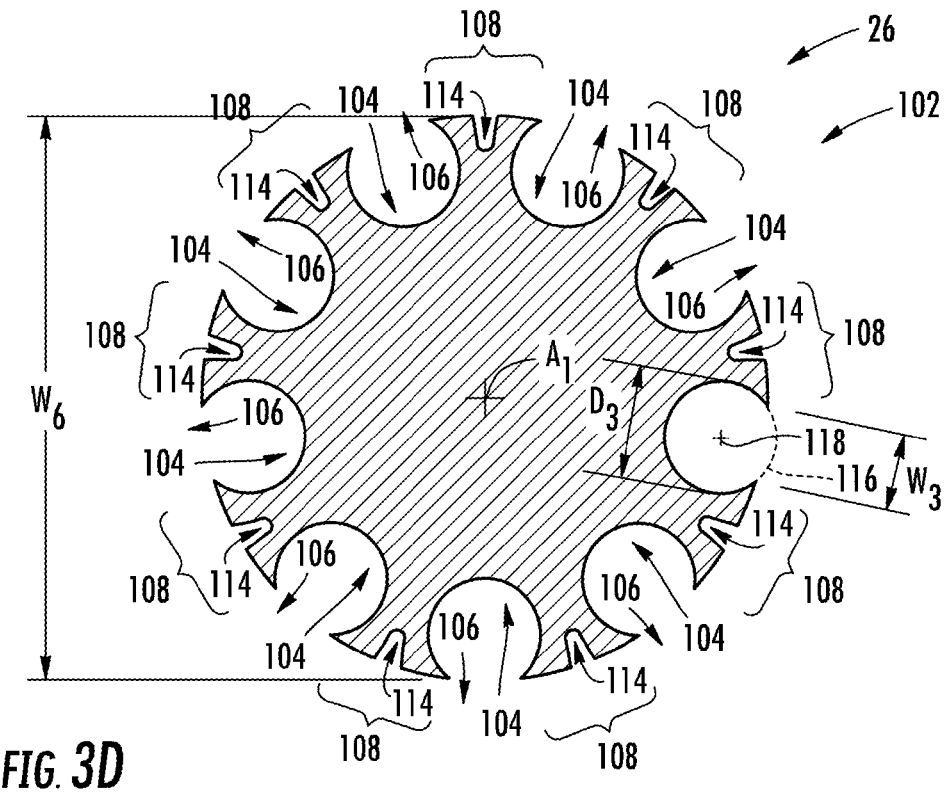
FIG. 3D is a cross-section of an intermediate portion of the elongated member of FIG. 3A.

As shown in a cross-section 102 of the intermediate portion 100 perpendicular to the longitudinal axis $A_1$ in FIG. 3D, the intermediate portion 100 includes a plurality of third recesses 104 forming a plurality of third openings 106 configured to each receive one of the plurality of fiber optic cables 58. The plurality of fiber optic cables 58 may be received into plurality of third recesses 104 through the plurality of third openings 106 in a direction substantially perpendicular to the longitudinal axis $A_1$ as opposed to sliding the plurality of fiber optic cables 58 longitudinally through the plurality of third recesses 104. Sliding the plurality of fiber optic cables 58 longitudinally may not be feasible if the plurality of fiber optic cables 58 have the connectors 74 (shown later in FIG. 10) which would be too wide to slide in a longitudinal direction through the plurality of third recesses 104. Each of the plurality of third recesses 104 may be separated by one of a plurality of third external surfaces 108 and may be disposed or orientated parallel to the longitudinal axis $A_1$.

As depicted in FIGS. 3A, 3B and 3D, a width $W_4$ of the cross-section 69 of the strain relief portion 68 may be wider than a width $W_6$ of the cross-section 102 of the intermediate portion 100. This difference enables the plurality of external surfaces 76 and the plurality of third external surfaces 108 to be attached to a plurality of shoulder surfaces 110 (see FIG. 3A). The plurality of shoulder surfaces 110 may be disposed between the strain relief portion 68 and the intermediate portion 100 and may partially face longitudinally toward the second end 66 of the elongated member 26. Likewise, as depicted in FIGS. 3A, 3C and 3D, a width $W_6$ of the cross-section 102 of the intermediate portion 100 may be wider than a width $W_5$ of the cross-section 88 of the sealing portion 86. This difference enables the plurality of second external surfaces 94 and the plurality of third external surfaces 108 to be attached to a plurality of second shoulder surfaces 111. The plurality of second shoulder surfaces 111 (see FIG. 3A) may be disposed between the sealing portion 86 and the intermediate portion 100 and may partially face longitudinally toward the second end 66 of the elongated member 26.

The plurality of shoulder surfaces 110 and plurality of second shoulder surfaces 111 may be utilized to position the elongated member 26 within the cable fitting assembly 28, and to prevent the elongated member 26 from being pulled out of the cable fitting assembly 28 attached to the fiber optic enclosure 29 (discussed later) to the outside by a tensile force on the plurality of fiber optic cables 58 directed away from the fiber optic enclosure 29.

As shown in FIG. 3D, one or more of the plurality of third external surfaces 108 may include at least one second groove 114. The at least one second groove 114 may provide more flexibility to the plurality of third external surfaces 108 to enable the plurality of fiber optic cables 58 to be more easily received through the plurality of third openings 106 to be disposed in the plurality of third recesses 104.

Each of the plurality of third recesses 104 may include a circular-shaped cross-section 116 having a diameter $D_3$ and a center 118, The circular-shaped cross-section 116 may enable the plurality of third recesses 104 to better fit the contour of a circular-shaped cross section of each of the plurality of fiber optic cables 58 (discussed later) and thereby improve strain relief by preventing slippage of plurality of fiber optic cables 58.

The diameter $D_3$ may be sized for the particular cable size that will be received and thereby may be approximately up to 6% smaller than the nominal diameter of the plurality of fiber optic cables 58.

Each of the plurality of third openings 106 may include a width $W_3$. The width $W_3$ may be a minimum width within a cross-section 102 of each of the plurality of third openings 106. For each of the plurality of third openings 106, the width $W_3$ may be of a smaller distance than the diameter $D_3$ of the circular-shaped cross-section 116 of the plurality of third recesses 104. The plurality of fiber optic cables 58 may be held more tightly in the plurality of third recesses 104 if the width $W_3$ is of the smaller distance.

The intermediate portion 100 may be made of a strong, resilient material, for example, a thermoplastic, thermoplastic elastomer or a thermoplastic polyester elastomer. The cross-section 102 of the intermediate portion 100 may remain unchanged parallel to the longitudinal axis $A_1$ to enable the intermediate portion 100 to be manufactured using an extrusion process (not shown) using these or other materials.

The plurality of recesses 70, plurality of second recesses 90, and the plurality of third recesses 104 may be aligned to permit the plurality of fiber optic cables 58 to be received by all of these recesses as depicted by longitudinal axis $A_2$ in FIG. 3A. The diameter $D_1$, diameter $D_2$, and diameter $D_3$ may be equal. Further, each of the plurality of recesses 70, the plurality of second recesses 90, and the plurality of third recesses 104 may be configured to maintain each of the plurality of fiber optic cables 58 equidistant from the longitudinal axis $A_1$ between the first end 64 and the second end 66 (as shown later in FIG. 11).

Finally, the outer diameter $W_6$ of the intermediate portion 100 may be less than the outer diameter $W_4$ of the strain relief portion 68 and greater than the outer diameter $W_5$ of the sealing portion 86. The difference in outer diameters may permit the elongated member from being pulled out through an orifice (introduced later as orifice 136) of the cable fitting assembly 28, which has a smaller inner diameter than the outer diameter of the strain relief portion 68.

Figure 4A:
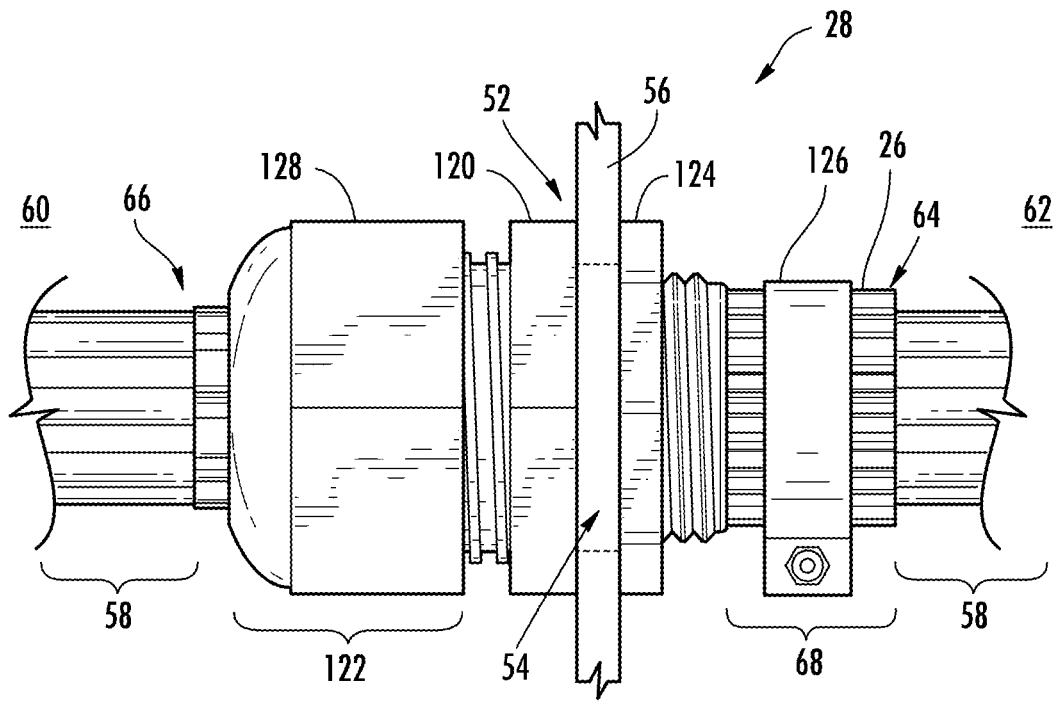
FIG. 4A is a side view of the cable fitting assembly containing the elongated member of FIG. 3A.

FIG. 4A depicts the cable fitting assembly 28 and the elongated member 26 for the opening 54 in the wall 56 of the fiber optic enclosure 29. The cable fitting assembly 28 may include an elongated cable fitting body 120, clamping mechanism 122, locknut 124, and circular clamp 126. In one embodiment, the elongated cable fitting body 120 and the clamping mechanism 122 may both be commercially available as a non-metallic cable gland, catalog number CC-NPT1-B, from the Thomas & Betts Corporation, headquartered in Memphis, Tenn. The locknut 124 may be a locknut designated as catalog number LN503, also commercially available from the Thomas & Betts Corporation.

The plurality of fiber optic cables 58 may enter the cable fitting assembly 28 from outside 60 the fiber optic enclosure 29 and exit inside 62 of the wall 56 of the fiber optic enclosure 29. The first end 64 and the second end 66 of the elongated member 26 may be disposed in the inside 62 and outside 60 of the wall 56, respectively. The second end 66 of the elongated member 26 may extend out of a compression cap 128 of the clamping mechanism 122. A circular clamp 126 may be secured to the strain relief portion 68 of the elongated member 26.

Note that in FIG. 4A, the plurality of individual fiber optic cables 58 are provided that are not disposed inside a single, common outer jacket or sheath to form a single fiber optic cable. However, in other embodiments, the fiber optic cables 58 could represent optical fibers that are disposed in a single cable jacket or sheath to form a fiber optic cable, with the fiber optic cables 58 broken out from an outer jacket or sheath of a fiber optic cable. The optical fibers may be disposed in individual jackets, sheaths, and/or outer coatings. The cross-section of each of the plurality of fiber optic cables 58 may be circular-shaped. The elongated member 26 could be provided to receive optical fibers broken out from an outer jacket or sheath of a fiber optic cable as discussed herein for the fiber optic cables 58. In this regard, fiber optic cables, including fiber optic cables 58 described herein as being received in the elongated member 26, also means that the fiber optic cables 58 could be individual optical fibers, jacketed or not, and coated or not.

Figure 4B:
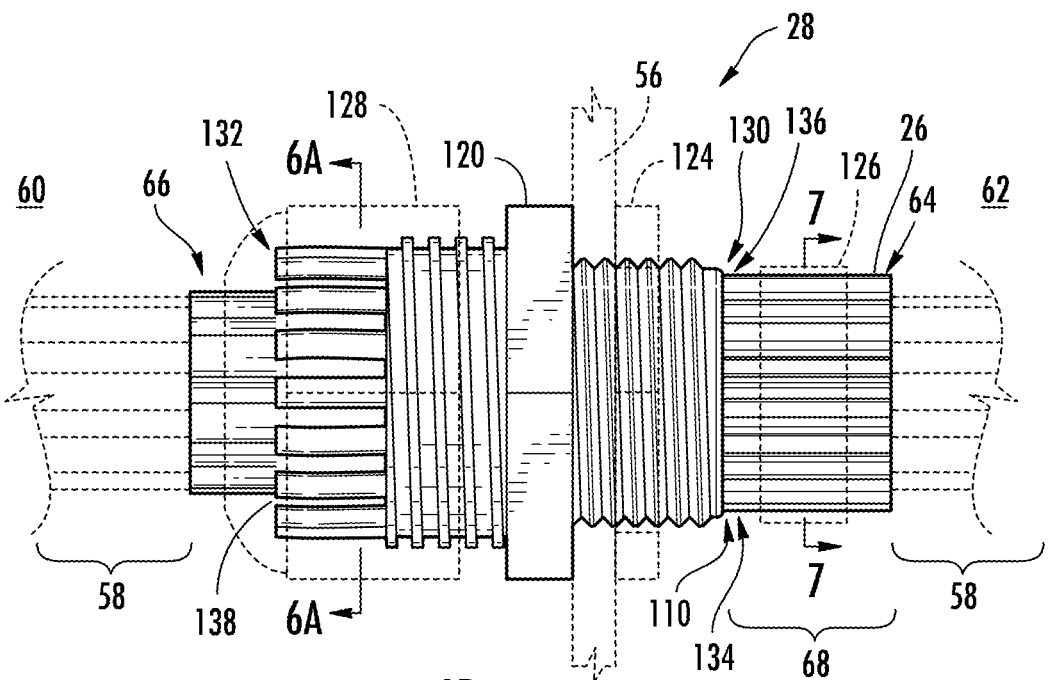
FIG. 4B is a partial cutaway side view of the cable fitting assembly containing the elongated member of FIG. 4A.

FIG. 4B illustrates a cutaway side view of the cable fitting assembly 28 showing a relative position of the elongated member 26 with respect to the elongated cable fitting body 120. Both the first cable fitting end 130 and the second cable fitting end 132 may be disposed between the first end 64 and second end 66 of the elongated member 26. This orientation permits the elongated cable fitting body 120 to serve as a platform to support the sealing and strain relief functions of the elongated member 26 and also to secure the elongated member 26 to the wall 56. The relative position may be determined by the plurality of shoulder surfaces 110 which are configured to form an interference fit 134 with the first cable fitting end 130 of the elongated fitting body as the second end 66 of the elongated member 26 may be disposed through an orifice 136 of the elongated cable fitting body 120, and the strain relief portion 68 remains outside the elongated cable fitting body 120.

Figure 4C:
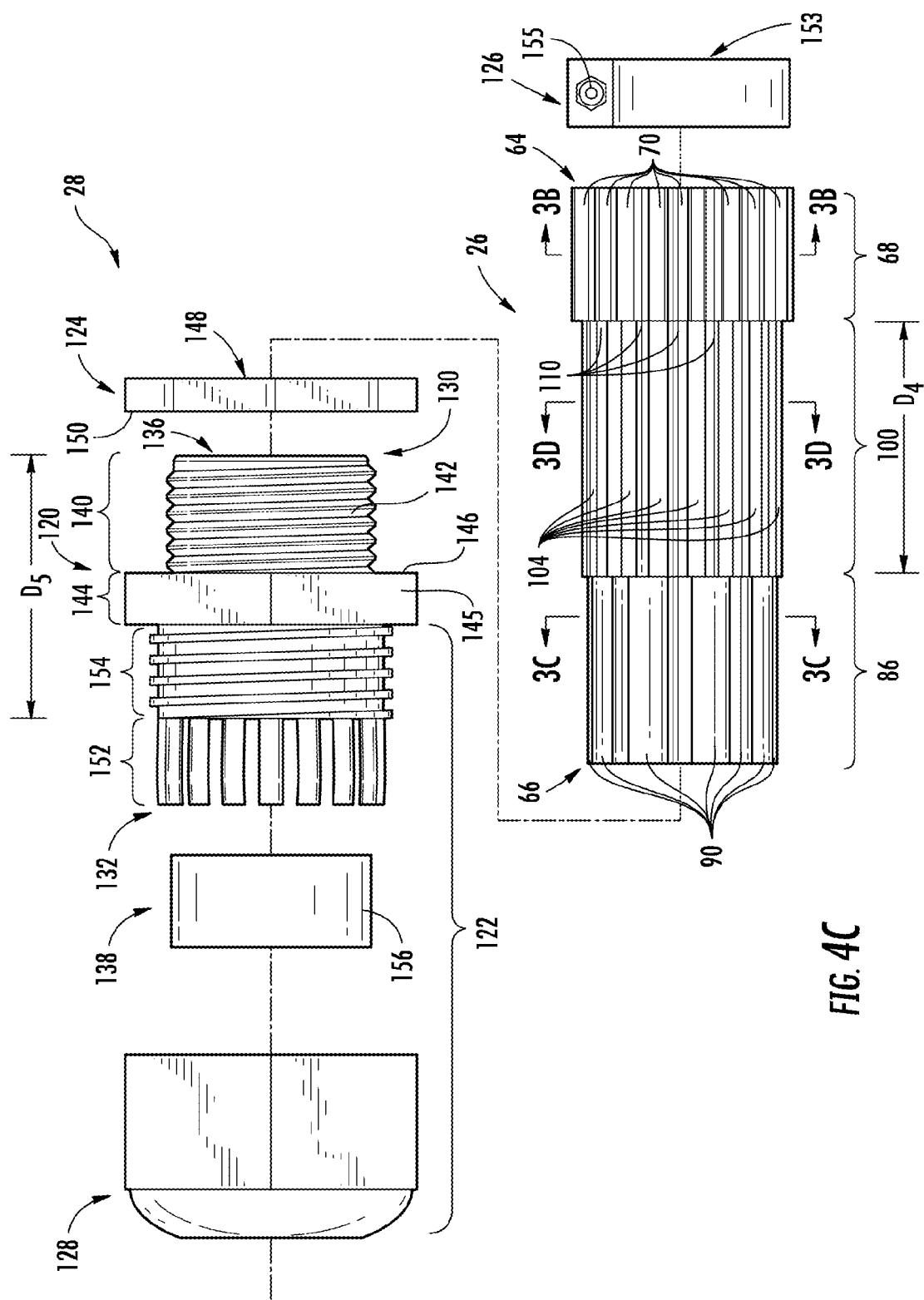
FIG. 4C is an exploded side view of the cable fitting assembly of FIG. 4A.
Figure 4D:
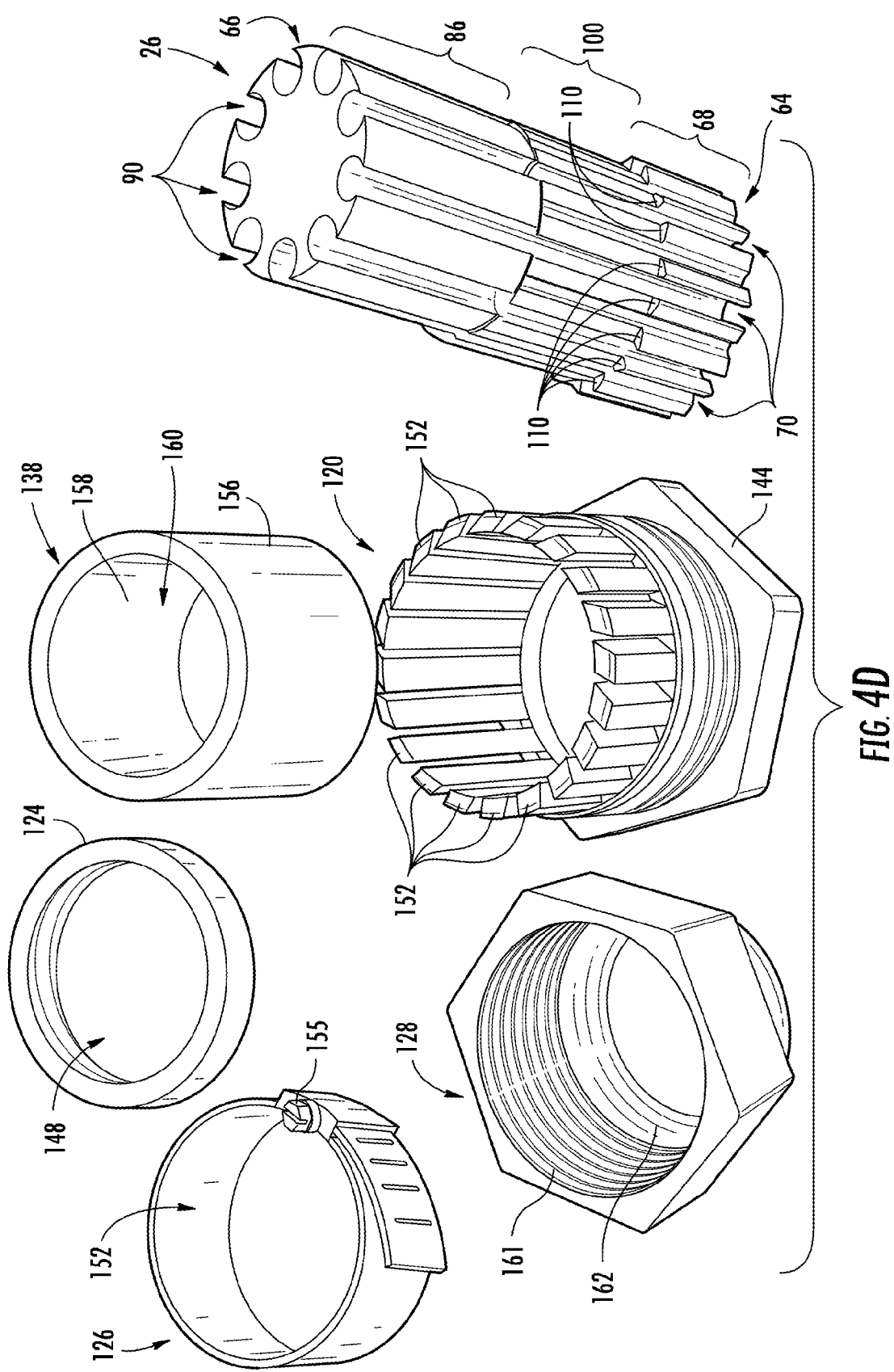
FIG. 4D is an exploded perspective view of the cable fitting assembly of FIG. 4A.

FIGS. 4C and 4D depict an exploded side and perspective views respectively of the elongated member 26 and the cable fitting assembly 28, showing the elongated cable fitting body 120, the compression cap 128, a seal ring 138, locknut 124, and circular clamp 126. The circular clamp 126 may be a hose clamp. The elongated cable fitting body 120 may include the first cable fitting end 130 comprising a first threaded portion 140 having a male thread 142, a second cable fitting end 132 opposite the first cable fitting end 130, an orifice 136, and a cable fitting base 144 disposed between the first cable fitting end 130 and the second cable fitting end 132.

The orifice 136 may be disposed through the elongated cable fitting body 120 from the first cable fitting end 130 to the second cable fitting end 132. The orifice 136 may also be configured to receive the plurality of fiber optic cables 58. The cable fitting base 144 may include a base wall surface 146 configured to contact the contact surface 52 around the opening 54 of the wall 56. The cable fitting base 144 may include flats 145 for interfacing with tools, for example, wrenches (not shown) to attach the elongated cable fitting body 120 to the wall 56.

The locknut 124 may include a threaded orifice 148 and locknut pushing surface 150. The locknut 124 may be configured to be removeably attached to the first cable fitting end 130 and may be configured to push the base wall surface 146 against the contact surface 52 around the opening 54 of the wall 56.

The circular clamp 126 may include an orifice 153 and a fastener 155 for securing the circular clamp 126 around the strain relief portion 68 of the elongated member 26. The fastener 155 may be used to adjust a size of the orifice 153.

The clamping mechanism 122 helps secure the elongated member 26 to the elongated cable fitting body 120 and it also seals the opening 54 in the wall 56. The clamping mechanism 122 includes a plurality of longitudinal protrusions 152, a second threaded portion 154 of the elongated cable fitting body 120, the seal ring 138, and the compression cap 128. The longitudinal protrusions 152 may be contained as part of the elongated cable fitting body 120 and disposed at the second cable fitting end 132. The longitudinal protrusions 152 are flexible to move to decrease an inner diameter of the second cable fitting end 132. The elongated cable fitting body 120 may include the second threaded portion 154 disposed between the plurality of longitudinal protrusions 152 and the cable fitting base 144.

The seal ring 138 may be disposed between the elongated member 26 and the plurality of longitudinal protrusions 152. The seal ring 138 may have a hollow cylindrical shape with an outer diameter surface 156, inner diameter surface 158, and orifice 160. The outer diameter surface 156 of the seal ring 138 may have a size to fit within the plurality of longitudinal protrusions 152. The inner diameter surface 158 of the seal ring 138 may have a size to fit around the sealing portion 86 of the elongated member 26 and may be the same size as the orifice 136 of the elongated cable fitting body 120.

The compression cap 128 may include a threaded portion 161 that may be removeably connected to the second threaded portion 154 of the elongated cable fitting body 120. A curved inner surface 162, which is curved in the longitudinal direction of the compression cap 128, may provide a plurality of second inwardly-directed forces directed towards an interior 164 (see FIG. 6A) of the sealing portion 86.

Figure 5:
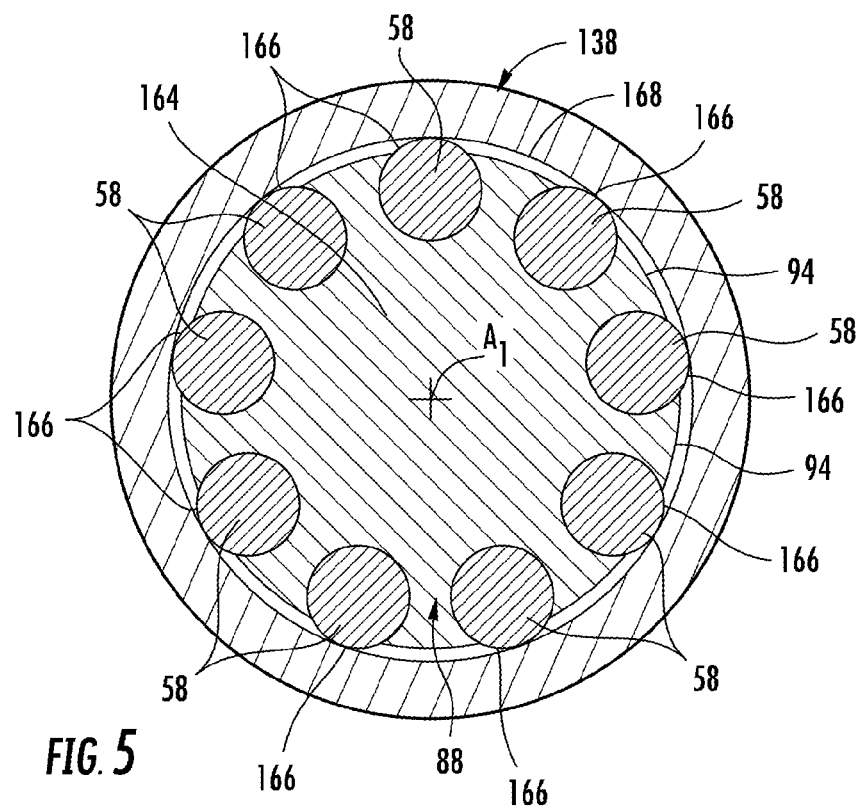
FIG. 5 is a partial cross-section of the cable fitting assembly of FIG. 4A showing the sealing ring, plurality of fiber optic cables, and gap between (before the compression cap is attached)

FIG. 5 depicts the plurality of fiber optic cables 58 received within the cross-section 88 of the sealing portion 86 which may be disposed within the longitudinal protrusions 152 and the seal ring 138 during assembly (depicted later in FIG. 12). A gap 168 may be disposed between the seal ring 138 and the cross-section 88 of the sealing portion 86. The gap 168 may be a portion of the opening 54 in the fiber optic enclosure 29 because it may be within the orifice 136 of the elongated cable fitting body 120. The orifice 136 may be the only passageway through of the opening 54 in the fiber optic enclosure 29 once the elongated cable fitting body 120 may be secured to the wall 56 with the locknut 124. Portions of the plurality of fiber optic cables 58 exposed from the plurality of second openings 92 may be disposed in this gap 168 prior to when the compression cap 128 may be removeably connected to the second threaded portion 154. The location of the cross-section of FIG. 5 is depicted in FIG. 12.

Figure 6A:
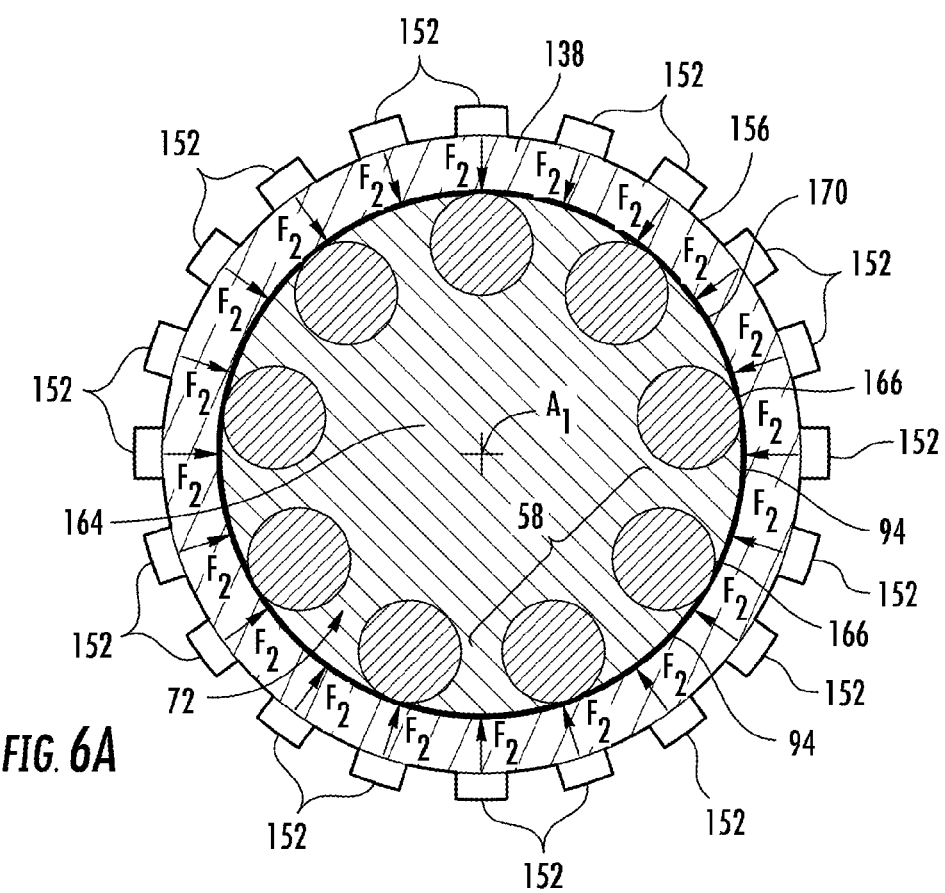
FIG. 6A is a partial cross-section of the cable fitting assembly of FIG. 4A showing a multi-component cylindrical surface.

FIG. 6A illustrates the formation of a multi-component cylindrical surface 170 located within the cable fitting assembly 28 as depicted in FIG. 4B. The multi-component cylindrical surface 170 may be formed when the plurality of second external surfaces 94 and portions 166 of the plurality of fiber optic cables 58 are subject to a plurality of second inwardly-directed forces $F_2$ directed towards an interior 164 of the sealing portion 86. The multi-component cylindrical surface 170 may be formed as the gap 168 is removed as the interior 164 may be compressed by up to 30%. Removing the gap 168 allows the opening 54 in the fiber optic enclosure 29 to be sealed and thereby seal the opening 54 of the wall 56 of the fiber optic enclosure 29.

The plurality of second inwardly-directed forces $F_2$ may be created as the threaded portion 161 of the compression cap 128 may be removeably connected to the second threaded portion 154 of the elongated cable fitting body 120. This removable connection forces the curved inner surface 162 into the plurality of longitudinal protrusions 152, which are flexible and able to transfer the plurality of second inwardly-directed forces $F_2$ to the outer diameter surface 156 of the seal ring 138. The seal ring 138 transfers this force to the plurality of second external surfaces 94 and portions 166 of the plurality of fiber optic cables 58 as shown in FIGS. 5 and 6A. The location of the cross-section of FIG. 6A is depicted in FIG. 4B.

Figure 6B:
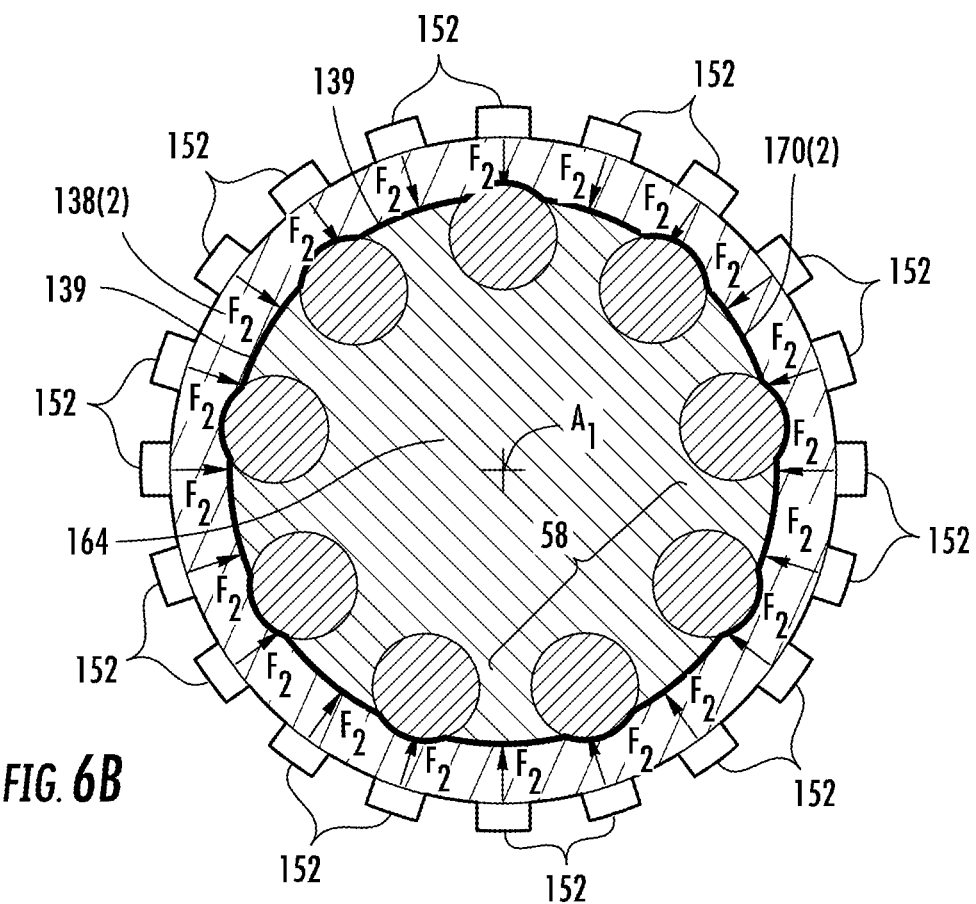
FIG. 6B is a partial cross-section of the cable fitting assembly of FIG. 4A showing an alternative embodiment to the multi-component cylindrical surface.
Figure 6C:
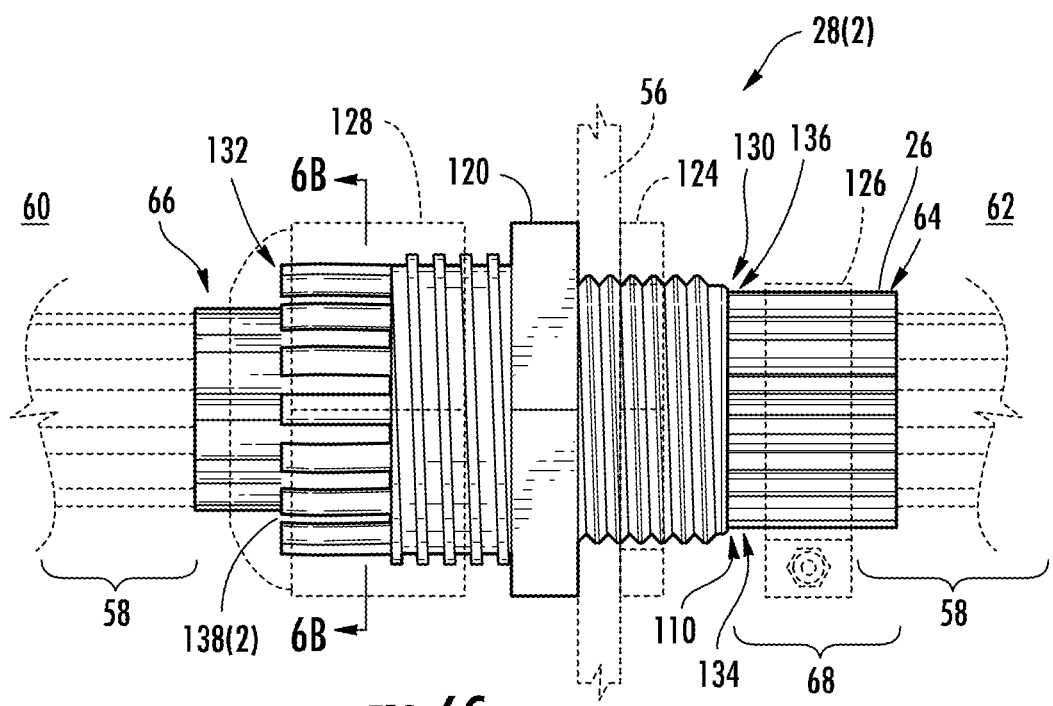
FIG. 6C is a partial cutaway side view of a second embodiment of a cable fitting assembly containing the elongated member of FIG. 4A and a second embodiment of a seal ring.

FIG. 6B depicts a cross-section of an alternative embodiment of the multi-component cylindrical surface 170 realized as a multi-component cylindrical surface 170(2) shown in FIG. 6C. In this alternative embodiment, a seal ring 138(2) may be made of a more flexible material easier to deform under the plurality of second inwardly-directed forces $F_2$ than the seal ring 138 of the embodiment of FIG. 6A. Accordingly, portions 139 of the seal ring 138(2) deform to fill the gap 168 between the portions 166 of the fiber optic cables 58 and thereby seal the opening 54 of the wall 56 of the fiber optic enclosure 29. The more flexible material may include an elastomer, for example, a saturated or unsaturated rubber. The location of the cross-section of FIG. 6B is depicted in FIG. 6C.

Figure 7:
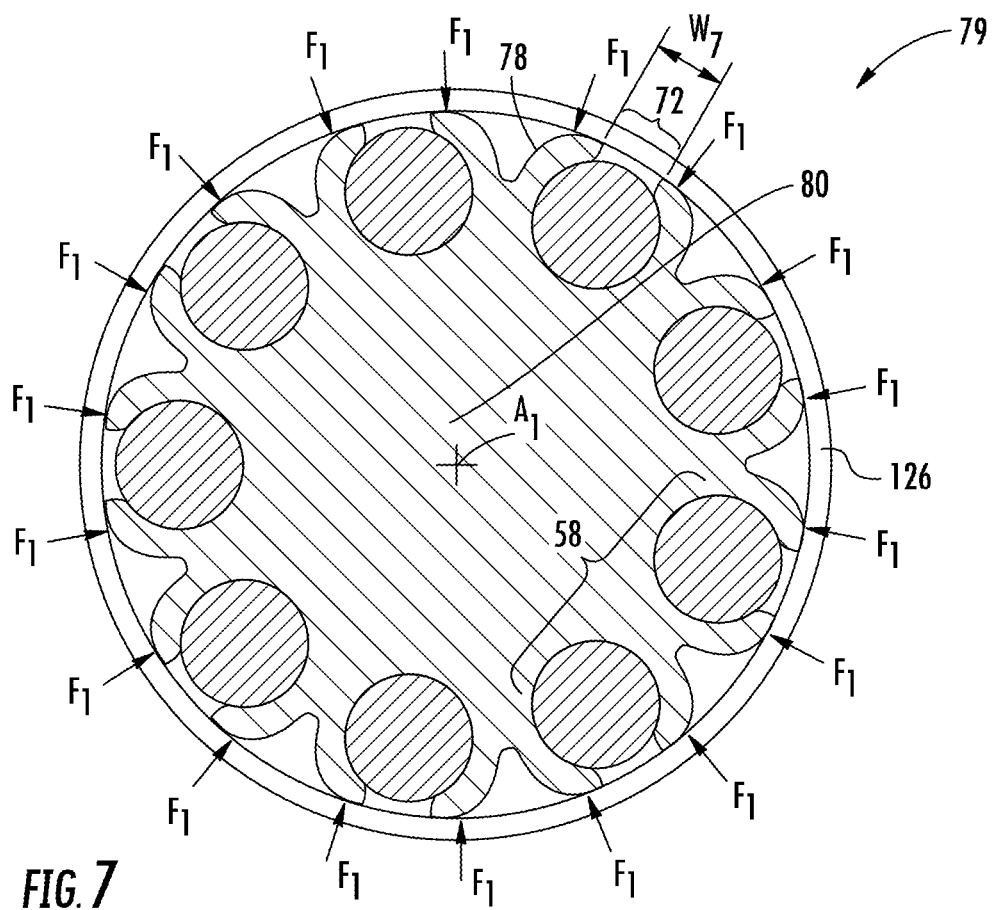
FIG. 7 is a partial cross-section of the cable fitting assembly of FIG. 4A showing the strain relief portion, the plurality of fiber optic cables, and plurality of inward-facing forces $F_1$.

In an analogous manner, FIG. 7 shows a cross-section 79 located within the cable fitting assembly 28 as depicted in FIG. 4B. The circular clamp 126 subjects the plurality of external surfaces 76, which comprise at least one extension member 78, to the plurality of inwardly-directed forces $F_1$. Each of the plurality of inwardly-directed forces $F_1$ is directed towards an interior 80 of the strain relief portion 68. A width $W_7$ of each of the plurality of openings 72 after the application of the plurality of inwardly-directed forces $F_1$ may be smaller than the width $W_1$ of the plurality of openings 72 prior to the application of the plurality of inwardly-directed forces $F_1$.

Figure 8A:
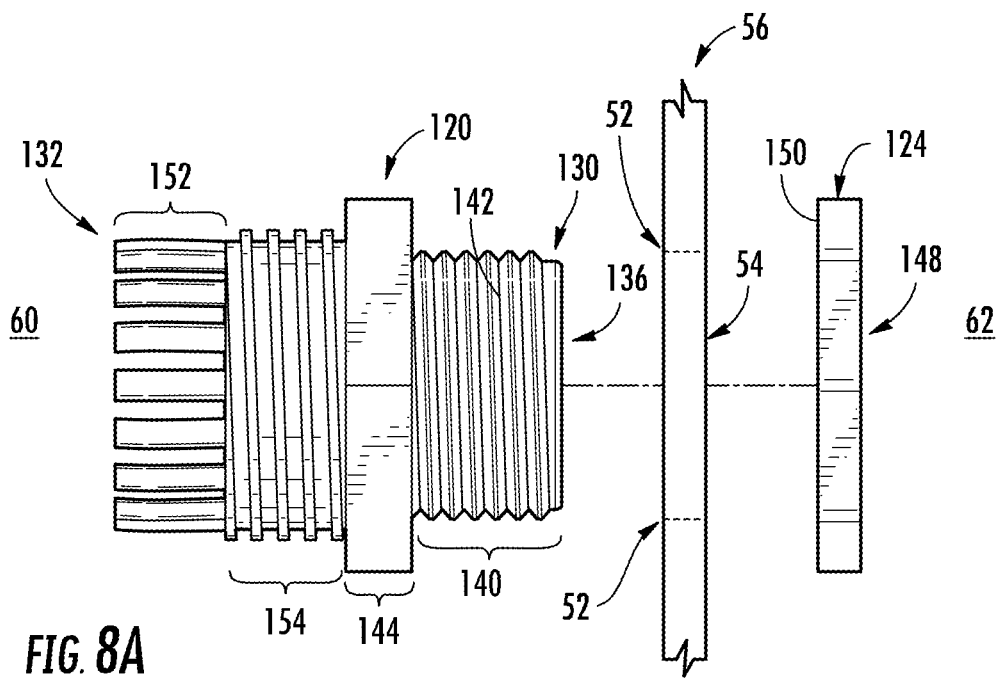
FIG. 8A is a side view showing an elongated cable fitting body and a locknut of FIG. 4A prior to attachment to a wall of a fiber optic enclosure (or terminal)

FIGS. 8A to 12 depict an exemplary method for installing the cable fitting assembly 28 with the plurality of fiber optic cables 58 inserted into the opening 54 of the wall 56 of the fiber optic enclosure 29. In FIG. 8A the elongated cable fitting body 120 and the locknut 124 may be provided to be made available for the installation. The elongated member 26 may be provided later in FIG. 11.

Figure 8B:
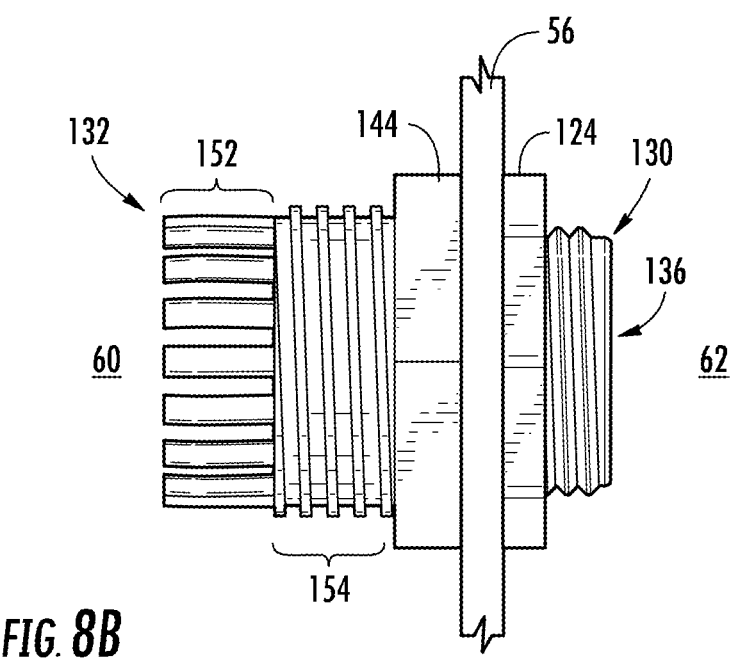
FIG. 8B is a side view showing an elongated cable fitting body and a locknut of FIG. 4A after attachment to the wall of the fiber optic enclosure (or terminal)

In FIG. 8B the first cable fitting end 130 of the elongated cable fitting body 120 may be inserted into an opening 54 of the wall 56 of the fiber optic enclosure 29. The locknut 124 may be secured to the first cable fitting end 130 to secure the elongated cable fitting body 120 to the opening 54 of the fiber optic enclosure 29 at a contact surface 52 around the opening 54.

Figure 9:
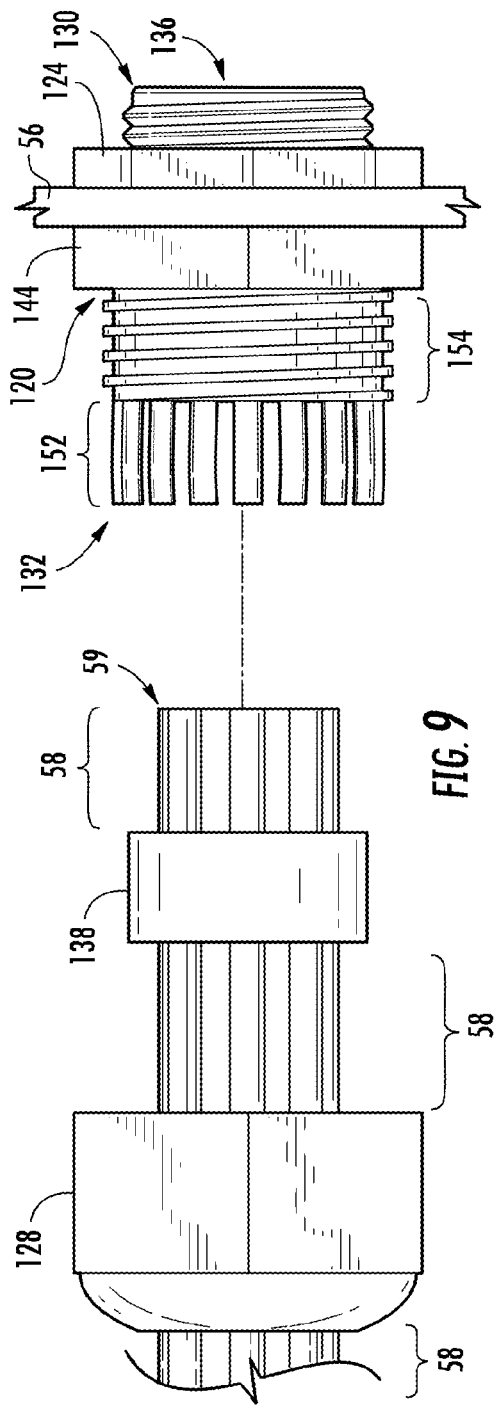
FIG. 9 is a side view showing a sealing ring and the compression cap of FIG. 4A being slid onto the plurality of fiber optic cables.
Figure 10:
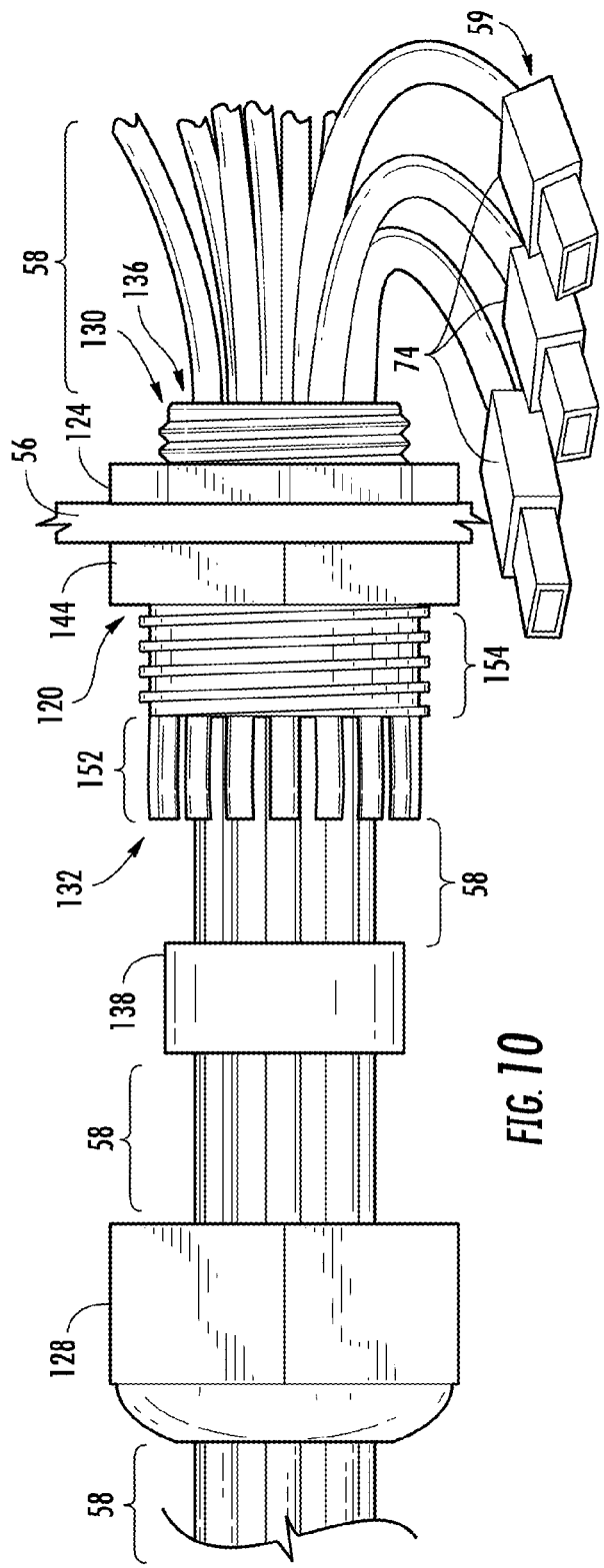
FIG. 10 is a side view showing the plurality of fiber optic cables of FIG. 4A being inserted through the elongated cable fitting body of FIG. 3A.

In FIG. 9 the compression cap 128 and the seal ring 138 are slid onto the end 59 of the plurality of fiber optic cables 58. In FIG. 10 the end 59 of the plurality of fiber optic cables 58 are inserted through an orifice 136 of the elongated cable fitting body 120. The end 59 of the plurality of fiber optic cables 58 may include connectors 74.

FIG. 11 depicts that the plurality of fiber optic cables 58 may be received in the plurality of recesses 70 in the strain relief portion 68 through the plurality of openings 72 and in the plurality of second recesses 90 in the sealing portion 86 through the plurality of second openings 92. The plurality of fiber optic cables 58 may also be received in the plurality of third recesses 104 in the intermediate portion 100 through the plurality of third openings 106.

FIG. 12 illustrates disposing the second end 66 of the elongated member 26 through the orifice 136 of the elongated cable fitting body 120. As the elongated member 26 moves through the orifice 136, the plurality of shoulder surfaces 110 will come in contact with the first cable fitting end 130 of the elongated cable fitting body 120 and prevent the strain relief portion 68 from entering the orifice 136. An interference fit may be formed because the plurality of shoulder surfaces 110 are positioned adjacent to the strain relief portion 68, which may have the width $W_4$ wider than the width of the orifice 136.

Moreover, the longitudinal length $D_4$ of the intermediate portion 100 may be less than the sum (shown by distance $D_5$ in FIG. 4C) of the longitudinal lengths of the first threaded portion 140 (see FIG. 4C), second threaded portion 154, and the cable fitting base 144. A longitudinal length $D_4$ of the intermediate portion 100 (see FIG. 4C), that is shorter than the longitudinal distance $D_4$ will prevent the intermediate portion 100 from contacting the plurality of longitudinal protrusions 152.

FIG. 12 further shows the seal ring 138 disposed between the elongated member 26 and the plurality of longitudinal protrusions 152 at the second cable fitting end 132 of the elongated cable fitting body 120. This new position of the seal ring 138 will enable the plurality of second inwardly-directed forces $F_2$ to be transferred from the plurality of longitudinal protrusions 152 to the sealing portion 86 (see FIGS. 5 and 12).

Results of additional steps in the method are depicted in FIG. 4A. The compression cap 128 may be secured to the second threaded portion 154 (see FIG. 4C), of the elongated cable fitting body 120 to subject the plurality of second external surfaces 94 and portions 166 (see FIG. 6A) of the plurality of fiber optic cables 58 to the plurality of second inwardly-directed forces $F_2$ directed towards an interior 164 of the sealing portion 86. The second inwardly-directed forces $F_2$ create the multi-component cylindrical surface 170 (see FIG. 6A), which seals a portion of the opening 54 in the fiber optic enclosure 29 disposed between the seal ring 138 and the elongated member 26. The portion of the opening 54 in the fiber optic enclosure 29 (see FIG. 2) may be the gap 168 illustrated in FIG. 5.

Further, the circular clamp 126 may be tightened around the plurality of fiber optic cables 58 and the at least one extension member 78 of the strain relief portion 68 to thereby apply a plurality of inwardly-directed forces $F_1$ directed towards an interior 80 of the strain relief portion 68 to the at least one extension member 78 as shown earlier in FIG. 7.

Figure 13:
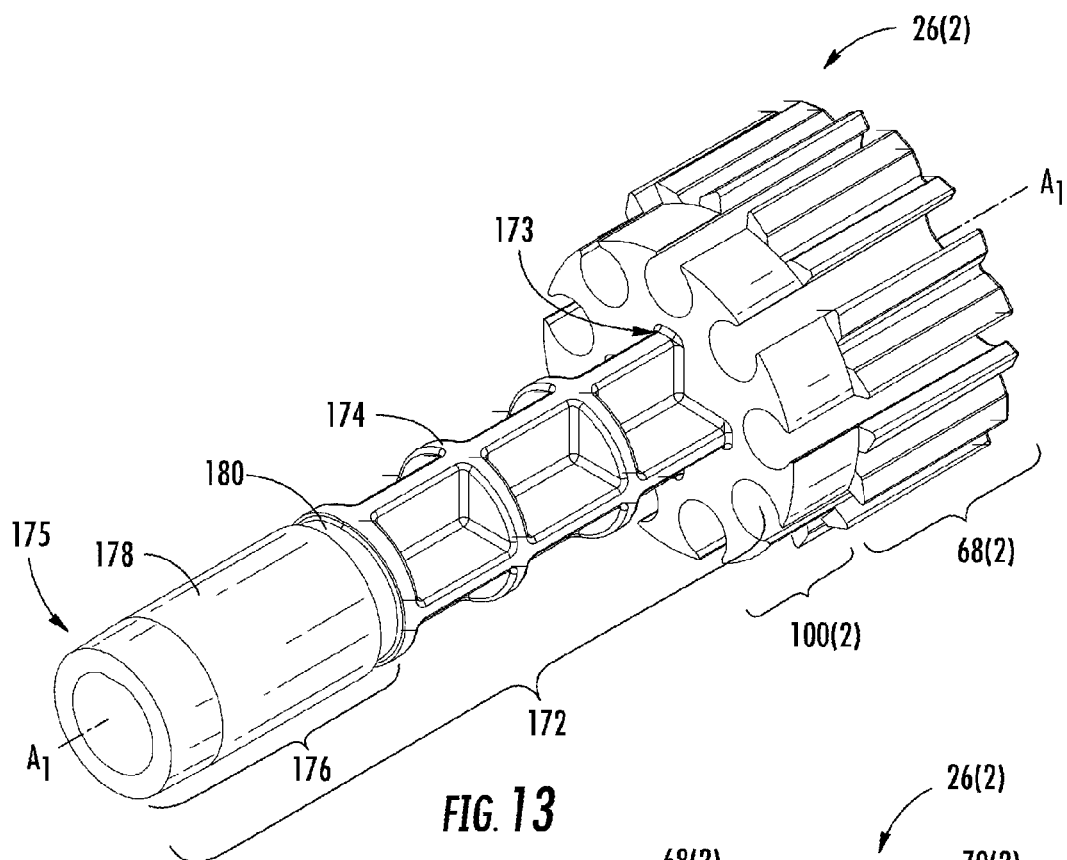
FIG. 13 is a perspective view of a second exemplary embodiment of an elongated member without a second embodiment of a sealing portion attached.
Figure 14:
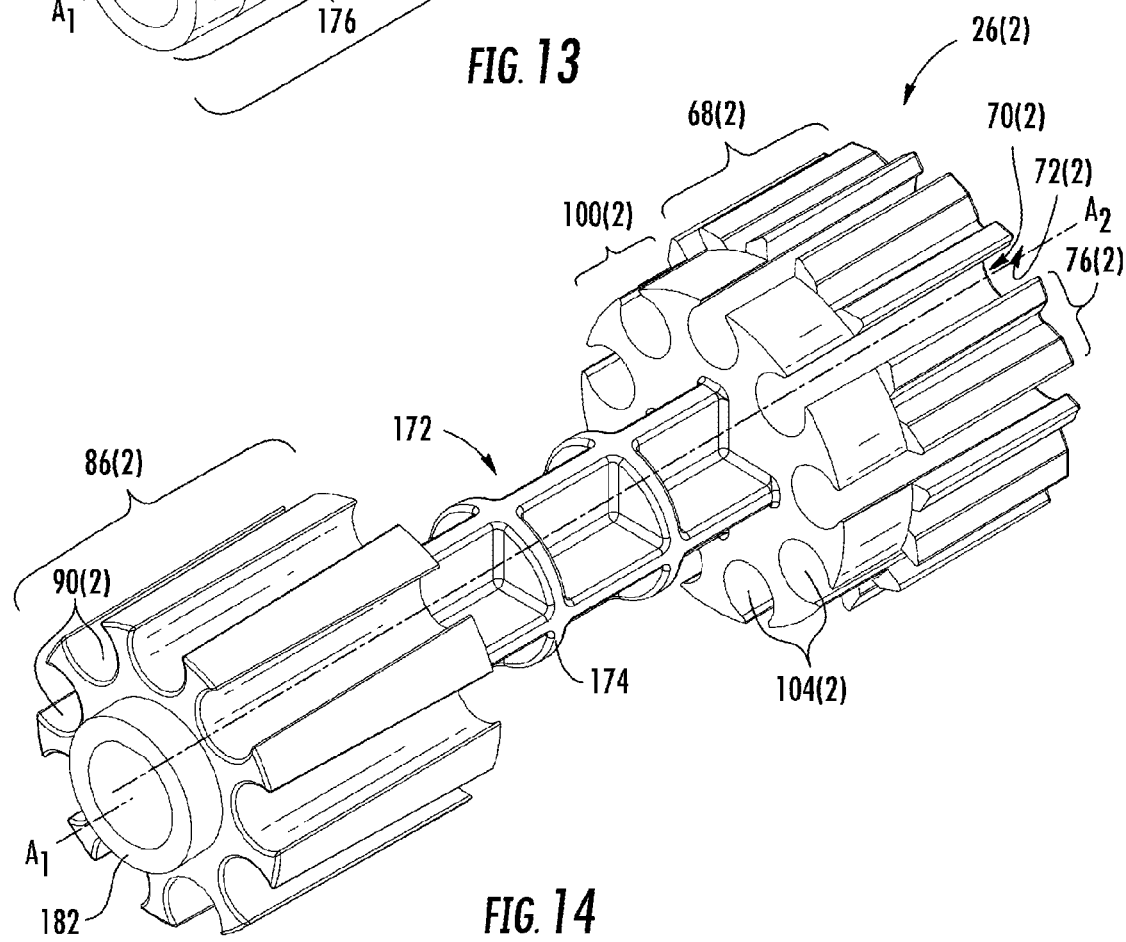
FIG. 14 is a perspective view of the elongated member of FIG. 13 with the second embodiment of the sealing portion attached.

Next, FIGS. 13 to 14 disclose a second embodiment of an elongated member 26(2). The main differences between this embodiment and the earlier embodiment may be that a strain relief portion 68(2), an intermediate portion 100(2), and an axial member 172 may be formed as an integrated component as shown in FIG. 13. Later, a sealing portion 86(2) may be overmolded upon the axial member 172 as shown in FIG. 14. The axial member 172 may be connected to the sealing portion 86(2) and the axial member 172 may be connected to the intermediate portion 100(2). However, the intermediate portion 100(2) may not be connected to the sealing portion 86(2) in order to save material costs.

The elongated member 26(2) may include the strain relief portion 68(2), the sealing portion 86(2), and the intermediate portion 100(2) having a plurality of recesses 70(2), plurality of second recesses 90(2), and plurality of third recesses 104(2), respectively. The plurality of recesses 70(2), the plurality of second recesses 90(2), and the plurality of third recesses 104(2) may be aligned as shown by the longitudinal axis $A_2$.

The axial member 172 may have a first end 173 and a second end 175, and the sealing portion 86(2) may be disposed on the second end 175 of the axial member 172 and the first end 173 of the axial member 172 may be disposed adjacent to the intermediate portion 100(2). The axial member 172 may connect the intermediate portion 100(2) to the sealing portion 86(2). The axial member 172 may be molded as a part of the strain relief portion 68(2) to simplify the manufacturing process.

The axial member 172 may be created from a molding process that creates an outer surface 174 including ribs that are dimensioned to a size to allow the mold material to properly flow (not shown) during manufacturing. The axial member 172 may extend from the intermediate portion 100(2) to form a core portion 176 having an outer surface 178 where the sealing portion 86(2) may be formed in an overmolding process on the outer surface 178. The outer surface may include at least one recess 180 to better attach the sealing portion 86(2) to the core portion 176 in order to prevent slipping. The axial member 172 may extend further from the intermediate portion 100(2) to a distal end 182. The distal end 182 may not be attached to the sealing portion 86(2) and thereby serve as a dimensional reference point during manufacturing.

One advantage to the elongated member 26(2) may be that at least one of the plurality of the fiber optic cables 58 may not contact the elongated member 26(2) at the outer surface 174 between the sealing portion 86(2) and the intermediate portion 100(2). This lack of contact permits the plurality of fiber optic cables 58 to be received easier into the elongated member 26(2).

Figure 15:
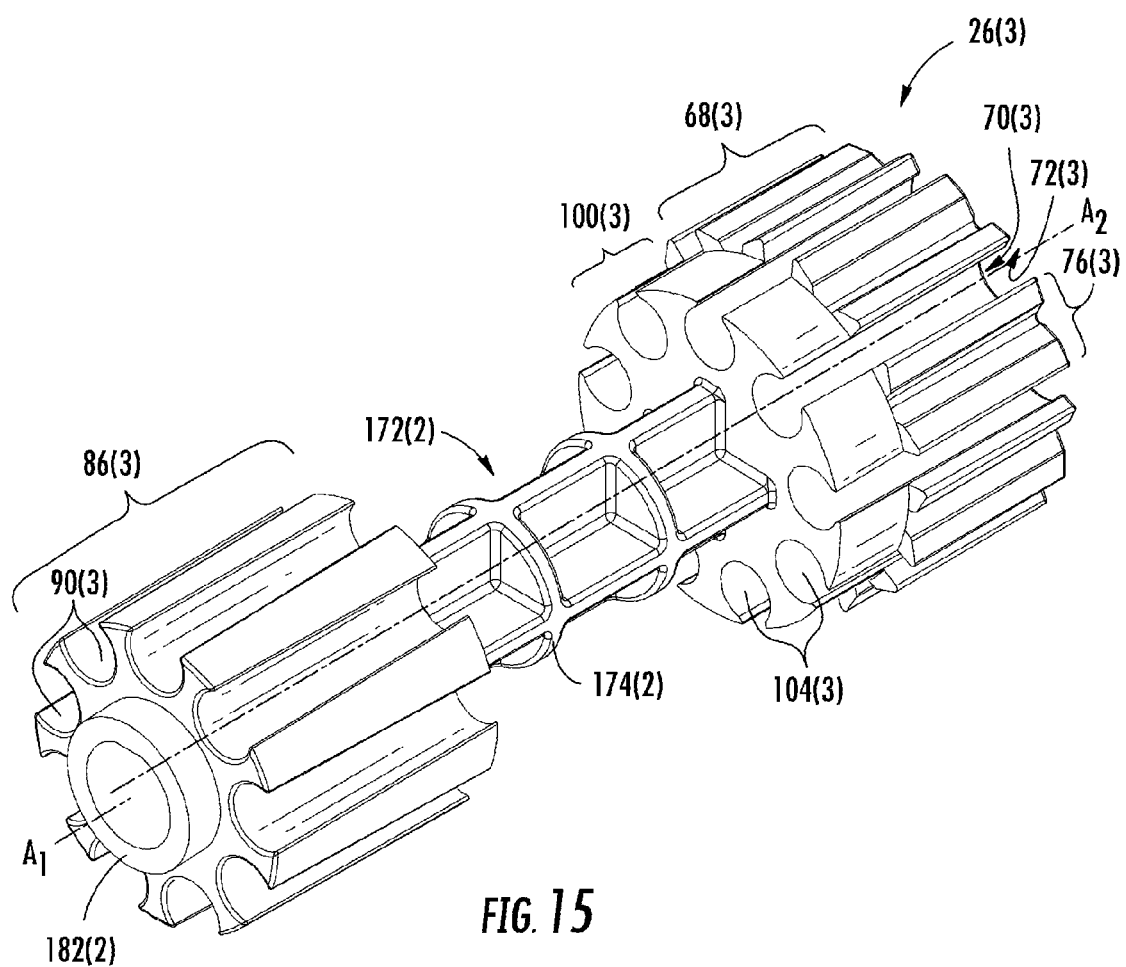
FIG. 15 is a perspective view of a third exemplary embodiment of an elongated member formed as an integrated body.

FIG. 15 depicts another embodiment of an elongated member 26(3). The elongated member 26(3) may include a strain relief portion 68(3), sealing portion 86(3), and intermediate portion 100(3) having a plurality of recesses 70(3), plurality of second recesses 90(3), and plurality of third recesses 104(3), respectively. The plurality of recesses 70(3), the plurality of second recesses 90(3), and the plurality of third recesses 104(3) may be aligned as shown by the longitudinal axis $A_2$. One difference between the elongated member 26(3) in this embodiment and the embodiment of the elongated member 26(2) in FIG. 14 is that the sealing portion 86(3), axial member 172(2), the intermediate portion 100(3), and the strain relief portion 68(3) may be manufactured as a single molded part. Other external characteristics of the third embodiment of the elongated member 26(3) may be the same as the second embodiment of the elongated member 26(2), for example, an outer surface 174(2), distal end 182(2), openings 72(3), and external surfaces 76(3). Manufacturing cost savings may be realized by making the elongated member 26(3) as a single molded part.

Figure 16:
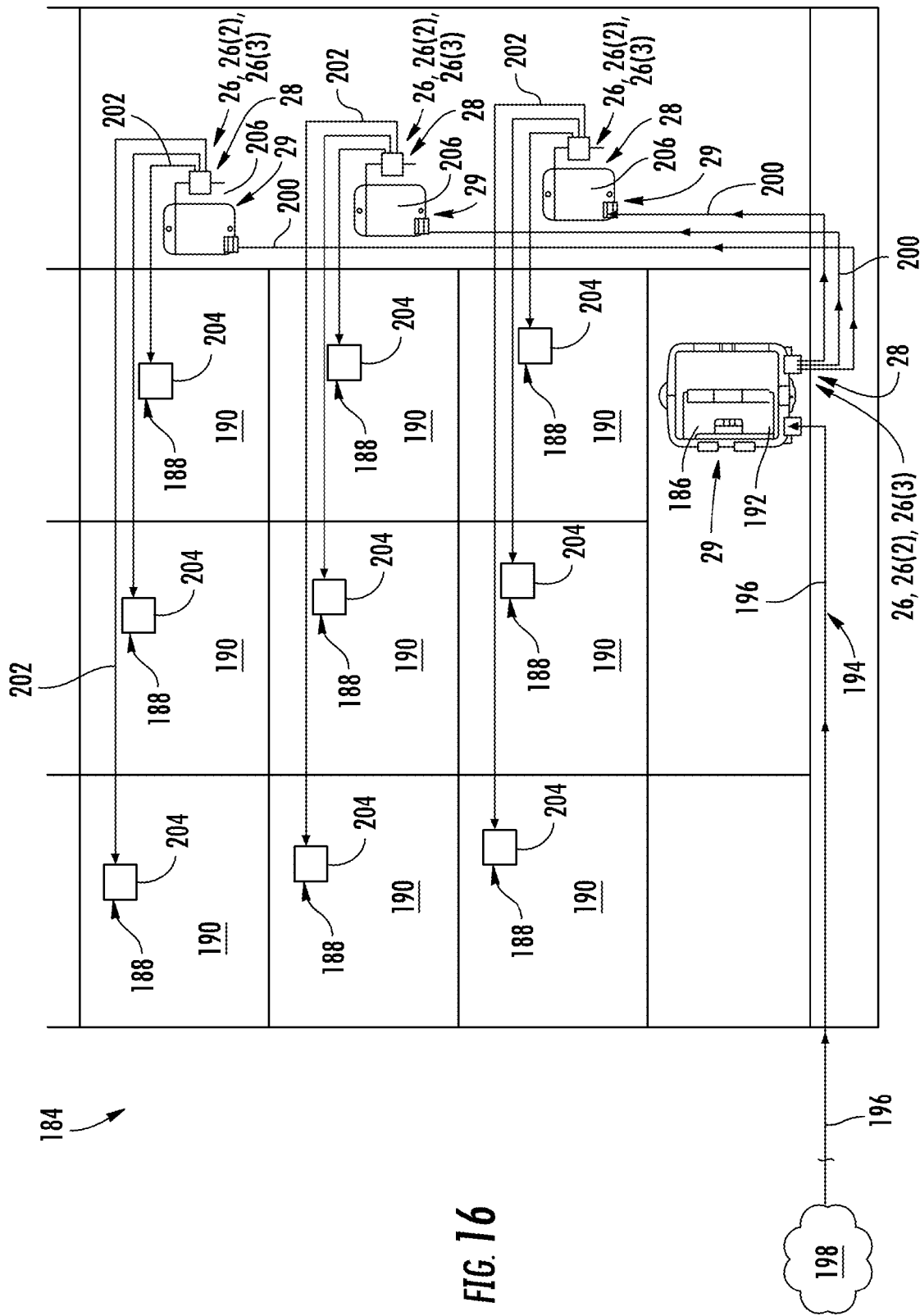
FIG. 16 depicts an exemplary MDU that includes fiber optic terminals that include local convergence points (LCPs) and fiber distribution terminals (FDTs) providing connectivity of end subscribers to the fiber optic network using the elongated member of the cable fitting assembly depicted in FIG. 4A.

FIG. 16 illustrates high-level overview of the various exemplary installations within a multi-dwelling unit (MDU) 184 of the fiber optic terminal 29 having the cable fitting 28 with any embodiment of the elongated member 26, 26(2), 26(3). The MDU 184 includes a portion of a fiber optic network from the LCP 186 to the ONU 188 at the multi-dwelling unit 190. The MDU 184 in this example includes nine (9) dwelling units 190 for illustrative purposes only. The LCP 186 is positioned on the ground floor or basement in the illustrated embodiment; however, the LCP 186 could be positioned at any location relative to the MDU 184. The LCP 186 includes a cable assembly 192 that is optically connected to a network-side fiber optic cable 194. For example, the network-side fiber optic cable 194 may be a feeder cable 196 optically connected to a central office or switching point 198. One or more subscriber-side fiber optic cables 200 may carry optical signals to and from the central switching point 198 and can be connected to the LCP 186, and exit the LCP 186 to extend throughout the MDU 184. For example, the subscriber-side fiber optic cables 200 may be distribution cables. The subscriber-side fiber optic cables 200 carry optical signals to and from the LCP 186 received from the central switching point 198 and extend to each dwelling unit 190 via subscriber-side optical fibers 202 or drop cables and eventually terminate at a subscriber termination point 204, such as an adapter in a wall outlet, an adapter in a floor panel, an adapter behind a ceiling tile, or the like such that the subscriber can optically connect to a subscriber-side optical fiber 202.

The subscriber-side optical fibers 202 can be directly provided from optical fibers from the subscriber-side fiber optic cable 200, or can be provided from one or more intermediate FDTs 206. The FDTs 206 can be provided to simplify the routing and installation of the subscriber-side optical fibers 202 between the LCP 186 and the subscriber termination points 204 by allowing the subscriber-side optical fibers 202 to be grouped between the LCP 186 and FDTs 206 and then separated at the FDTs 206. The FDTs 206 are configured to receive the subscriber-side fiber optic cables 200 and provide the individual subscriber-side optical fibers 202 to the subscriber termination points 204. Accordingly, there are fewer optical fibers 202 and/or fiber optic cables 200 extending between the floors of the MDU 184, thus simplifying routing of optical fibers through the MDU 184. Although floors of the MDU 184 are described in the illustrated embodiments, it should be appreciated that FDTs 206 may be used to facilitate optical fiber routing to any layout of areas within the MDU 184. Further, although the subscriber-side optical fibers 202 and the subscriber-side fiber optic cables 200 include arrows pointing in the direction of the subscriber termination points 204, it should be appreciated that optical signals may be passed in either direction as required for the particular application; the arrows are merely provided for illustrative purposes.

Consistent with the discussion above related to the MDU 184, there are various types of fiber optic terminals 29 (LCPs and FDTs) that have the opening 54 to allow the subscriber-side fiber optic cables 200 to exit and travel towards the subscriber premises 190. As the fiber optic network continues to adapt to the needs of subscribers, more fiber optic terminals 29 may be installed having a plurality of fiber optic cables 58 exiting the opening 54. The plurality of fiber optic cables 58 may be the subscriber-side fiber optic cables 200 or the subscriber-side optical fibers 202.

As used herein, it is intended that terms "fiber optic cables" and/or "optical fibers" include all types of single mode and multi-mode light waveguides, including one or more optical fibers that may be up-coated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments not set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An elongated member for sealing off an opening disposed through an enclosure wall having a plurality of cables disposed therethrough, comprising:
 a first end and a second end disposed opposite the first end along a longitudinal axis;
 a strain relief portion disposed at the first end, the strain relief portion includes a plurality of recesses forming a plurality of openings configured to each receive one of a plurality of fiber optic cables, each of the plurality of recesses separated by one of a plurality of external surfaces and disposed parallel to the longitudinal axis; and
 a sealing portion disposed at the second end, the sealing portion includes a plurality of second recesses forming a plurality of second openings configured to each receive one of the plurality of fiber optic cables, each of the plurality of second recesses separated by one of a plurality of second external surfaces and disposed parallel to the longitudinal axis,
 wherein an outer diameter of the strain relief portion is greater than an outer diameter the sealing portion.

2. The elongated member of claim 1, wherein an intermediate portion is disposed between the strain relief portion and the sealing portion.

3. The elongated member of claim 2, further comprising a shoulder portion formed from the outer diameter of the strain relief portion being greater than an outer diameter of the intermediate portion.

4. The elongated member of claim 3, wherein the shoulder portion is comprised of a plurality of shoulder surfaces disposed between the strain relief portion and the intermediate portion, the plurality of shoulder surfaces partially facing longitudinally toward the second end.

5. The elongated member of claim 2, further comprising an axial member having a first end and a second end, the sealing portion disposed on the first end of the axial member and the second end of the axial member disposed adjacent to the intermediate portion, and the axial member connecting the intermediate portion to the sealing portion, wherein the axial member is molded as a part of the strain relief portion.

6. The elongated member of claim 5, wherein the axial member includes an outer surface which has an outer diameter less than the inner diameter of the plurality of first and second recesses such that the plurality of fiber optic cables are configured not to contact the axial member when the plurality of fiber optic cables are received within both the plurality of first recesses and the plurality of second recesses.

7. The elongated member of claim 2, wherein the intermediate portion comprises a plurality of third recesses forming a plurality of third openings configured to each receive one of the plurality of fiber optic cables, each of the plurality of third recesses separated by one of a plurality of third external surfaces.

8. The elongated member of claim 7,
 wherein each first recess has a first diameter,
 wherein each second recess has a second diameter, and
 wherein the first diameter is equal to the second diameter.

9. The elongated member of claim 2, wherein an outer diameter of the intermediate portion is less than an outer diameter of the strain relief portion and greater than an outer diameter of the sealing portion.

10. The elongated member of claim 1, wherein the plurality of external surfaces are non-concentric external surfaces.

11. The elongated member of claim 1, wherein the plurality of second external surfaces and portions of the plurality of fiber optic cables exposed from the plurality of second openings when disposed therein are configured to form a multi-component cylindrical surface when subjected to a plurality of second inwardly-directed forces directed towards an interior of the sealing portion.

12. The elongated member of claim 1, wherein each of the plurality of external surfaces comprising at least one extension member configured to at least partially close one of the plurality of openings when subjected to a plurality of inwardly-facing forces directed towards an interior of the strain relief portion.

13. The elongated member of claim 1, wherein each of the plurality of recesses has a first width, and each of the plurality of openings has a second width smaller than the first width.

14. The elongated member of claim 1, wherein the cross-section of the strain relief portion remains unchanged along the longitudinal axis, and the cross-section of the sealing portion remains unchanged along the longitudinal axis.

15. The elongated member of claim 1, wherein the plurality of recesses is aligned with the plurality of second recesses.

16. The elongated member of claim 1, wherein the strain relief portion comprises a thermoplastic elastomer.

17. The elongated member of claim 1, wherein each of the plurality of second recesses has a first width, and each of the plurality of second openings has a second width smaller than the first width.

18. The elongated member of claim 1, wherein the sealing portion comprises a thermoplastic elastomer.

19. The elongated member of claim 1, wherein the plurality of second external surfaces are concentric.

20. A cable fitting assembly for an opening of a fiber optic enclosure, comprising:
   a cable fitting, comprising
   an elongated cable fitting body including a first cable fitting end comprising a first threaded portion, a second cable fitting end opposite the first cable fitting end, an orifice disposed therethrough from the first cable fitting end to the second cable fitting end, the orifice configured to receive a plurality of fiber optic cables, and a cable fitting base disposed between the first fitting end and the second fitting end, the cable fitting base comprising a base wall surface configured to form a contact area on a surface around an orifice of an enclosure wall,
   a clamping mechanism,
   a locknut including a threaded orifice and locknut pushing surface, the locknut configured to be removeably attached to the first cable fitting end and configured to pull the base wall surface against the contact area; and
   an elongated member comprising
   a first end and a second end, the first end is disposed within the orifice of the elongated cable fitting body, and the first end opposite a second end along a longitudinal axis,
   a strain relief portion disposed at the first end, the strain relief portion includes a plurality of recesses forming a plurality of openings configured to each receive one of the plurality of fiber optic cables, each of the plurality of recesses separated by one of a plurality of external surfaces and disposed parallel to the longitudinal axis,
   a sealing portion disposed at the second end, the sealing portion includes a plurality of second recesses forming a plurality of second openings configured to each receive one of the plurality of fiber optic cables, each of the plurality of second recesses separated by one of a plurality of second external surfaces and disposed parallel to the longitudinal axis, and
   an intermediate portion disposed between the strain relief portion and the sealing portion,
   wherein an outer diameter of the strain relief portion is greater than an outer diameter of the sealing portion.

21. The cable fitting assembly of claim 20, wherein the clamping mechanism comprises:
   a plurality of longitudinal protrusions of the elongated cable fitting body disposed at the second cable fitting end;
   a second threaded portion of the elongated cable fitting body disposed between the plurality of longitudinal protrusions and the cable fitting base;
   a seal ring disposed between the elongated member and the plurality of longitudinal protrusions; and
   a compression cap removeably connected to the threaded portion of the elongated cable fitting body, a curved inner surface of the compression cap providing a plurality of second inwardly-directed forces directed towards an interior of the sealing portion.

22. The cable fitting assembly of claim 20, wherein the plurality of external surfaces are non-concentric external surfaces.

23. The cable fitting assembly of claim 20, wherein the plurality of second external surfaces and portions of the plurality of fiber optic cables exposed from the plurality of second openings when disposed therein are configured to form a multi-component cylindrical surface when subjected to a plurality of second inwardly-directed forces directed towards an interior of the sealing portion.

24. The cable fitting assembly of claim 20, wherein portions of the seal ring at least partially deform to fill a gap disposed between portions of the fiber optic cables when subjected to a plurality of second inwardly-directed forces directed towards an interior of the sealing portion.

25. The cable fitting assembly of claim 20, wherein each of the plurality of external surfaces comprising at least one extension member configured to at least partially close one of the plurality of openings when subjected to a plurality of inwardly-facing forces directed towards an interior of the strain relief portion.

26. The cable fitting assembly of claim 20, wherein each of the plurality of recesses has a first width, and each of the plurality of openings has a second width smaller than the first width.

27. The cable fitting assembly of claim 20, wherein the cross-section of the strain relief portion remains unchanged along the longitudinal axis, and the cross-section of the sealing portion remains unchanged along the longitudinal axis.

28. The cable fitting assembly of claim 20, further comprising a shoulder portion formed from the outer diameter of the strain relief portion being greater than an outer diameter of the intermediate portion.

29. The cable fitting assembly of claim 28, wherein the shoulder portion is comprised of a plurality of shoulder surfaces disposed between the strain relief portion and the intermediate portion, the plurality of shoulder surfaces partially facing longitudinally toward the second end.

30. The cable fitting assembly of claim 20, wherein the plurality of recesses is aligned with the plurality of second recesses.

31. The cable fitting assembly of claim 20, wherein the strain relief portion comprises a thermoplastic elastomer.

32. The cable fitting assembly of claim 20, wherein each of the plurality of second recesses has a first width, and each of the plurality of second openings has a second width smaller than the first width.

33. The cable fitting assembly of claim 20, wherein the sealing portion comprises a thermoplastic elastomer.

34. The cable fitting assembly of claim 20, wherein the intermediate portion comprises a plurality of third recesses forming a plurality of third openings configured to each receive one of the plurality of fiber optic cables, each of the plurality of third recesses separated by one of a plurality of third external surfaces.

35. The cable fitting assembly of claim 34,
   wherein each first recess has a first diameter,
   wherein each second recess has a second diameter, and
   wherein the first diameter is equal to the second diameter.

36. The cable fitting assembly of claim 20, wherein an outer diameter of the intermediate portion is less than an outer diameter of the strain relief portion and greater than an outer diameter of the sealing portion.

37. The cable fitting assembly of claim 20, wherein the plurality of second external surfaces are concentric.

38. The cable fitting assembly of claim 20, further comprising an axial member having a first end and a second end, the sealing portion disposed on the first end of the axial member and the second end of the axial member disposed adjacent to the intermediate portion, and the axial member connecting the intermediate portion to the sealing portion, wherein the axial member is molded as a part of the strain relief portion.

39. The cable fitting assembly of claim 38, wherein the axial member includes an outer surface which has an outer diameter less than the inner diameter of the plurality of first and second recesses such that the plurality of fiber optic cables are configured not to contact the axial member when the plurality of fiber optic cables are received within both the plurality of first recesses and the plurality of second recesses.

40. The cable fitting assembly of claim 20, wherein a longitudinal length of the intermediate portion is less than the sum of longitudinal lengths of the first threaded portion, the second threaded portion and the cable fitting base.

41. The elongated member of claim 20, wherein the first end of the elongated cable fitting body has an outer diameter that is less than the outer diameter of the strain relief portion to prevent the strain relief portion from entering the elongated cable fitting body.

42. A method of installing a cable fitting assembly with a plurality of fiber optic cables into an opening of a fiber optic enclosure, comprising:
  inserting a first cable fitting end of an elongated cable fitting body through an opening of a fiber optic enclosure and securing the first cable fitting end to the fiber optic enclosure with a locknut;
  inserting an end of a plurality of fiber optic cables through an orifice of the elongated cable fitting body;
  receiving the plurality of the fiber optic cables through a plurality of openings into a plurality of recesses in a strain relief portion having a first diameter and disposed at a first end of an elongated member, each of the plurality of recesses separated by one of a plurality of external surfaces and disposed parallel to the longitudinal axis; and
  receiving the plurality of the fiber optic cables through a plurality of second openings into a plurality of second recesses in a sealing portion having a second diameter smaller than the first diameter and disposed at a second end of the elongated member, each of the plurality of second recesses separated by one of a plurality of second external surfaces and disposed parallel to the longitudinal axis,
  wherein an outer diameter of the strain relief portion is greater than an outer diameter the sealing portion.

43. The method of claim 42, further comprising:
  disposing the second end of the elongated member in the orifice of the elongated cable fitting body; and
  moving the elongated member in the longitudinal direction through the orifice of the elongated cable fitting body until an interference fit is formed between a first cable fitting end of the elongated cable fitting body and a plurality of shoulder surfaces of a plurality of external surfaces of the strain relief portion, wherein the plurality of shoulder surfaces partially face longitudinally toward the second end.

44. The method of claim 43, further comprising:
  disposing a seal ring between the elongated member and a plurality of longitudinal protrusions at the second cable fitting end of the elongated cable fitting body, the second cable fitting end opposite the first cable fitting end along the longitudinal direction; and
  securing the compression cap to a threaded portion of the elongated cable fitting body to subject the plurality of second external surfaces and portions of the plurality of fiber optic cables to a plurality of second inwardly-directed forces directed towards an interior of the sealing portion to create a multi-component cylindrical surface sealing a portion of an opening in the fiber optic enclosure disposed between a seal ring and the elongated member,
  wherein the multi-component cylindrical surface is comprised of portions of the plurality of fiber optic cables and the second external surfaces.

45. The method of claim 44, further comprising:
  tightening a circular clamp around the plurality of fiber optic cables and the at least one extension member of the strain relief portion to thereby apply a plurality of inwardly-directed forces directed towards an interior of the strain relief portion to the at least one extension member,
  wherein the plurality of inwardly-directed forces at least partially closes one of the plurality of openings.

46. The method of claim 45, wherein the receiving the plurality of the fiber optic cables through the plurality of openings and the plurality of second openings, further comprises:
  at least one of the plurality of the fiber optic cables does not contact the elongated member between the sealing portion and the strain relief portion, and an intermediate portion separates the sealing portion from the strain relief portion.

* * * * *